United States Patent
Kim et al.

(10) Patent No.: US 10,978,068 B2
(45) Date of Patent: Apr. 13, 2021

(54) METHOD AND APPARATUS FOR EXECUTING APPLICATION ON BASIS OF VOICE COMMANDS

(71) Applicant: Samsung Electronics Co., Ltd., Suwon-si (KR)

(72) Inventors: Sung-jin Kim, Yongin-si (KR); Il-koo Kim, Seongnam-si (KR); Sang-ha Kim, Seoul (KR); Kyoung-jin Moon, Suwon-si (KR); Ji-sang Yu, Seoul (KR); Byung-joon Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 16/345,491

(22) PCT Filed: Oct. 25, 2017

(86) PCT No.: PCT/KR2017/011833
§ 371 (c)(1),
(2) Date: Apr. 26, 2019

(87) PCT Pub. No.: WO2018/080162
PCT Pub. Date: May 3, 2018

(65) Prior Publication Data
US 2019/0311717 A1     Oct. 10, 2019

(30) Foreign Application Priority Data
Oct. 27, 2016 (KR) .................. 10-2016-0141177

(51) Int. Cl.
*G10L 21/00* (2013.01)
*G10L 25/00* (2013.01)
(Continued)

(52) U.S. Cl.
CPC ............ *G10L 15/22* (2013.01); *G06F 3/0481* (2013.01); *G06F 3/0483* (2013.01);
(Continued)

(58) Field of Classification Search
CPC .... G06F 3/0481; G06F 3/0483; G06F 3/0484; G06F 3/16; G06F 3/167; G10L 15/22; G10L 15/26; G10L 2015/223
(Continued)

(56) References Cited

U.S. PATENT DOCUMENTS 8,386,260 B2 * 2/2013 Engelsma ........... H04M 3/4938
704/270.1
8,948,819 B2 * 2/2015 Yun ...................... G06F 40/171
455/566

(Continued)

FOREIGN PATENT DOCUMENTS

KR     10-2013-0082339 A     7/2013
KR         10-1295711 B1       8/2013
(Continued)

OTHER PUBLICATIONS

International Search Report dated Mar. 5, 2018, issued in International Patent Application No. PCT/KR2017/011833.

*Primary Examiner* — Khai N. Nguyen
(74) *Attorney, Agent, or Firm* — Jefferson IP Law, LLP

(57) ABSTRACT

A method, performed by an electronic apparatus, of executing an application, based on a voice input of a user, and the electronic apparatus are provided. The method includes performing voice recognition on the voice command for executing the application, determining a target page among a plurality of pages displayable when the application is executed, based on a result of the voice recognition, generating a virtual input sequence for displaying a second screen corresponding to the target page, instead of a first screen
(Continued)

currently displayed, and executing the application in response to the virtual input sequence.

15 Claims, 17 Drawing Sheets

(51) Int. Cl.
*G10L 15/22* (2006.01)
*G06F 3/0483* (2013.01)
*G06F 3/16* (2006.01)
*G06F 3/0484* (2013.01)
*G06F 3/0481* (2013.01)
*G10L 15/26* (2006.01)

(52) U.S. Cl.
CPC ............. *G06F 3/0484* (2013.01); *G06F 3/16* (2013.01); *G06F 3/167* (2013.01); *G10L 15/26* (2013.01); *G10L 2015/223* (2013.01)

(58) Field of Classification Search
USPC ........................................................ 704/275
See application file for complete search history.

(56) References Cited

U.S. PATENT DOCUMENTS

| | | | | |
|---|---|---|---|---|
| 9,195,388 B2* | 11/2015 | Shepherd | ................ | G06F 21/32 |
| 9,298,361 B2* | 3/2016 | Shepherd | ............. | G06F 3/0488 |
| 9,513,888 B1* | 12/2016 | Fultz | ....................... | H04W 4/60 |
| 9,600,178 B2* | 3/2017 | Yun | ........................ | G06F 16/951 |
| 9,778,837 B2* | 10/2017 | Shepherd | ................ | G06F 21/32 |
| 9,811,196 B2* | 11/2017 | Yang | ...................... | G06F 1/1626 |
| 2008/0288878 A1* | 11/2008 | Hayashi | ............ | H04M 1/72547 |
| | | | | 715/762 |
| 2009/0171669 A1* | 7/2009 | Engelsma | ........... | H04M 3/4938 |
| | | | | 704/275 |
| 2011/0185013 A1* | 7/2011 | Obata | ................. | G06F 9/44536 |
| | | | | 709/203 |
| 2011/0185043 A1* | 7/2011 | Zeller | ...................... | H04L 67/10 |
| | | | | 709/219 |
| 2012/0209608 A1* | 8/2012 | Lee | .......................... | G06F 3/167 |
| | | | | 704/246 |
| 2012/0302167 A1* | 11/2012 | Yun | ....................... | G06F 3/0416 |
| | | | | 455/41.2 |
| 2012/0303583 A1 | 11/2012 | Chowdhry | | |
| 2013/0179173 A1* | 7/2013 | Lee | .......................... | G10L 15/22 |
| | | | | 704/275 |
| 2014/0270258 A1* | 9/2014 | Wang | ...................... | G06F 3/167 |
| | | | | 381/110 |
| 2014/0283128 A1* | 9/2014 | Shepherd | ................ | G06F 21/74 |
| | | | | 726/28 |
| 2014/0283135 A1* | 9/2014 | Shepherd | ............ | G06F 3/04817 |
| | | | | 726/29 |
| 2014/0283141 A1* | 9/2014 | Shepherd | ............ | G06F 21/6245 |
| | | | | 726/30 |
| 2015/0116251 A1* | 4/2015 | Yun | ....................... | G06F 16/951 |
| | | | | 345/173 |
| 2015/0254058 A1* | 9/2015 | Klein | ...................... | G06F 3/167 |
| | | | | 704/275 |
| 2016/0018942 A1* | 1/2016 | Kang | .................... | G06F 3/0416 |
| | | | | 345/173 |
| 2017/0068661 A1* | 3/2017 | Yu | ......................... | G06F 40/169 |
| 2017/0351537 A1* | 12/2017 | AbiEzzi | .................. | G06F 9/452 |
| 2018/0173494 A1* | 6/2018 | Choi | ....................... | G10L 15/08 |
| 2019/0255041 A1* | 8/2019 | Jin | ........................ | A61K 31/496 |
| 2019/0311717 A1* | 10/2019 | Kim | ........................ | G06F 3/0483 |

FOREIGN PATENT DOCUMENTS

| KR | 10-2013-0108438 A | 10/2013 |
|---|---|---|
| KR | 10-2014-0114519 A | 9/2014 |
| KR | 10-1579292 B1 | 12/2015 |

* cited by examiner

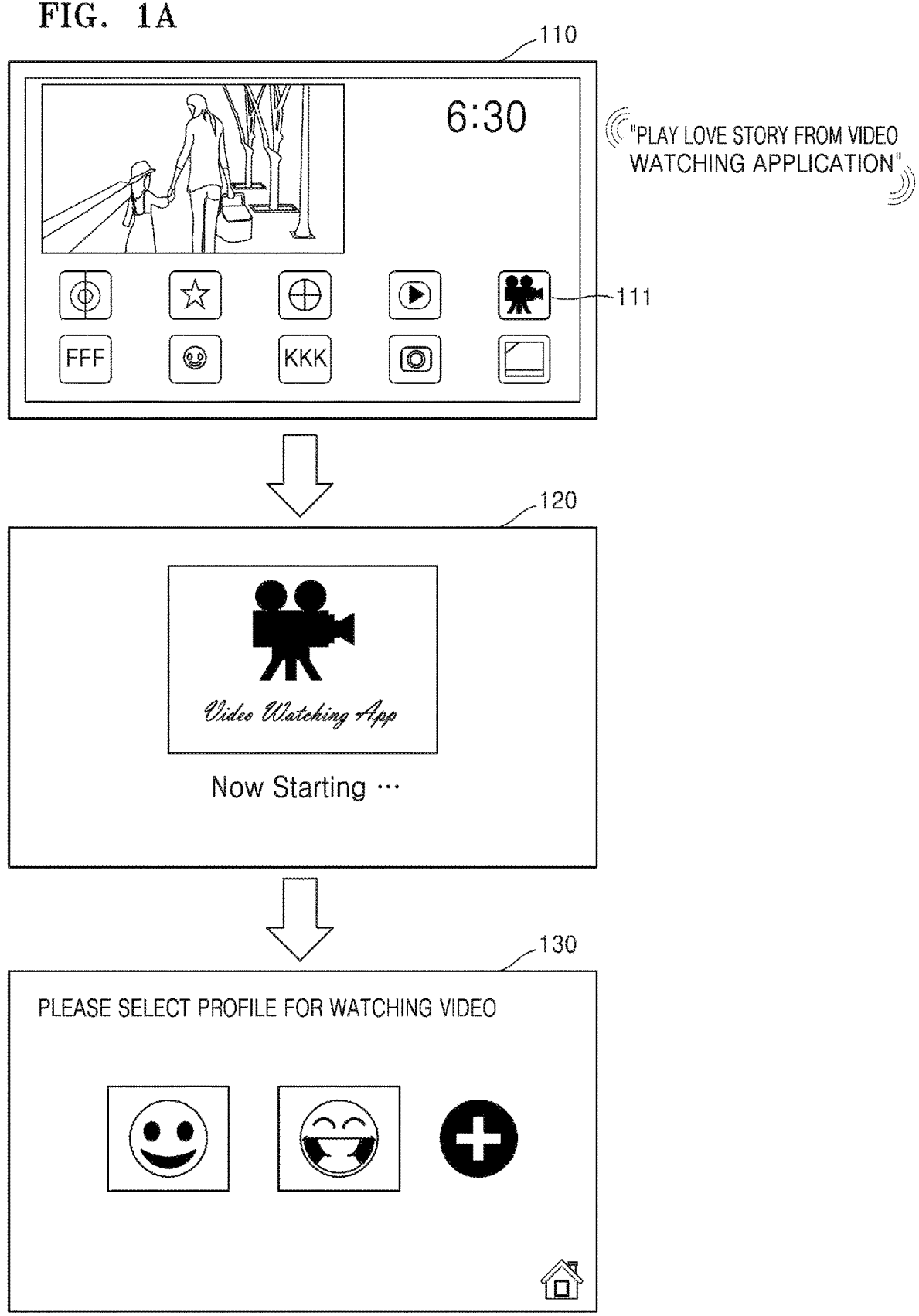

FIG. 7A

| VIRTUAL INPUT SEQUENCE | SEARCH KEYWORD |
|---|---|
| 711 — Right 4 → down 1 → ok | ㅅ |
| 712 — Left 4 → down 3 → ok | 사 |
| 713 — Up 3 → ok | 사ㄹ |
| 714 — down 3 → ok | 사라 |
| 715 — Up 2 → right 1 → ok | 사랑 |
| 716 — Right 4 → ok | PLAY |

METHOD AND APPARATUS FOR EXECUTING APPLICATION ON BASIS OF VOICE COMMANDS

CROSS-REFERENCE TO RELATED APPLICATION(S)

This application is a U.S. National Stage application under 35 U.S.C. § 371 of an International application number PCT/KR2017/011833, filed on Oct. 25, 2017, which is based on and claimed priority of a Korean patent application number 10-2016-0141177, filed on Oct. 27, 2016, in the Korean Intellectual Property Office, the disclosure of which is incorporated by reference herein in its entirety.

BACKGROUND

1. Field

The present disclosure relates to a method and apparatus for executing an application based on a voice command, and more particularly, to a method and apparatus for generating a virtual input based on a voice command and executing an application in response to the generated virtual input.

2. Description of the Related Art

With the recent development of electronic apparatuses complexly performing various functions, such as a smart phone, electronic apparatuses having a voice recognition function to improve operability have been released. The voice recognition function causes various functions of an apparatus to be easily performed without separate button manipulation or a touch on a touch module, by recognizing user's voice.

According to such a voice recognition function, for example, a portable terminal, such as a smart phone, may perform a call function or prepare a text message without a user having to press a separate button. Also, according to the voice recognition function of the electronic apparatus, the user may easily control the electronic apparatuses to perform various operations, such as navigating, internet searching, alarm setting, and the like.

Meanwhile, in order for the electronic apparatus to be used for various purposes, an application may be additionally installed on the electronic apparatus according to purposes. An application installable on the electronic apparatus may be provided by a manufacturer of the electronic apparatus or a manufacturer of an operating system (OS) of the electronic apparatus, or may be provided by a third party provider.

SUMMARY

When an application that does not support voice control is newly installed and an application programming interface (API) of the application is not open, it is difficult for an electronic apparatus to drive and control the application based on a voice command of a user.

Accordingly, provided is a method, performed by an electronic apparatus, of executing an application, the method including performing an operation corresponding to a voice command of a user by executing an application in response to a virtual input generated based on the voice command.

Additional aspects will be set forth in part in the description which follows and, in part, will be apparent from the description, or may be learned by practice of the presented embodiments.

According to an aspect of the disclosure, a method, performed by an electronic apparatus, of executing an application based on a voice command of a user, the method includes: performing voice recognition on the voice command for executing the application; determining a target page among a plurality of pages displayable when the application is executed, based on a result of the voice recognition; generating a virtual input sequence for displaying a second screen corresponding to the target page, instead of a first screen currently displayed; and executing the application in response to the virtual input sequence.

According to another aspect of the disclosure, an electronic apparatus includes: a receiver configured to receive a voice command of a user; at least one processor configured to perform voice recognition on the voice command, determine a target page among a plurality of pages displayable when the application is executed, based on a result of the voice recognition, generate a virtual input sequence for displaying a second screen corresponding to the target page, instead of a first screen currently displayed, and execute the application in response to the virtual input sequence; and a display displaying the first screen.

According to another aspect of the disclosure, a computer-readable recording medium has recorded thereon instructions that cause an electronic apparatus to execute an application based on a voice command of a user, wherein a method of executing the application includes: performing voice recognition on the voice command for executing the application; determining a target page among a plurality of pages displayable when the application is executed, based on a result of the voice recognition; generating a virtual input sequence for displaying a second screen corresponding to the target page, instead of a first screen currently displayed; and executing the application in response to the virtual input sequence.

According to another aspect of the disclosure, a server communicating with an electronic apparatus, the server includes: a receiver configured to receive a voice command of a user input through the electronic apparatus; at least one processor configured to perform voice recognition on the voice command, determine a target page among a plurality of pages displayable when an application is executed in the electronic apparatus, and generate a virtual input sequence for controlling the electronic apparatus to display a second screen corresponding to the target page, instead of a first screen currently displayed by the electronic apparatus; and a transmitter configured to transmit the virtual input sequence to the electronic apparatus, wherein the electronic apparatus executes the application in response to the virtual input sequence.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIGS. 1A and 1B illustrate screens on which an application that does not support voice control is executed by an electronic apparatus according to the related art;

FIGS. 7A and 7B illustrate examples of a virtual input sequence generated by an electronic apparatus, according to various embodiments of the disclosure;

DETAILED DESCRIPTION

Figure 1B:
Figure 1B:
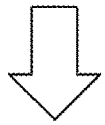
Figure 1B:
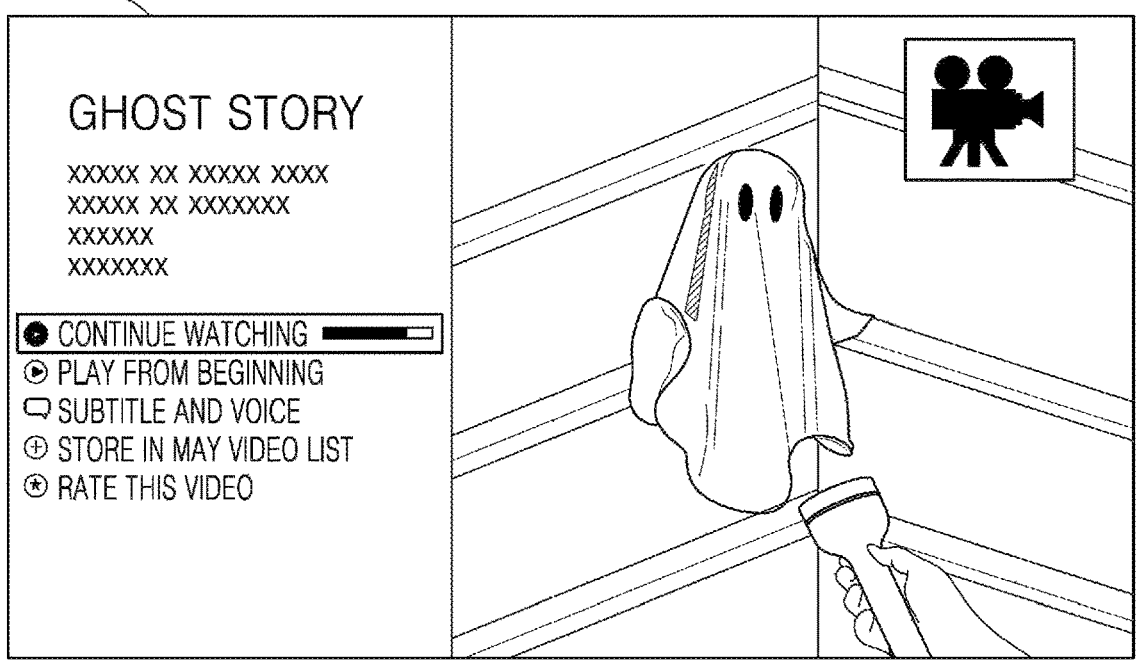

Hereinafter, embodiments the present disclosure will be described more fully with reference to the accompanying drawings to be easily executed by one of ordinary skill in the art. This disclosure may, however, be embodied in many different forms and should not be construed as limited to the exemplary embodiments set forth herein. In drawings, elements irrelevant to description are not shown for clear description, and like elements denote like reference numerals throughout the specification.

All terms used herein should be construed as having meanings that are obvious to one of ordinary skill in the art. However, the terms may have different meanings according to an intention of one of ordinary skill in the art, precedent cases, or the appearance of new technologies. Thus, the terms used herein have to be defined based on the meaning of the terms together with the description throughout the specification.

While such terms as "first," "second," etc., may be used to describe various components, such components must not be limited to the above terms. The above terms are used only to distinguish one component from another.

The terms used in the present specification are merely used to describe particular embodiments, and are not intended to limit the present disclosure. An expression used in the singular encompasses the expression in the plural, unless it has a clearly different meaning in the context. Also, throughout the specification, when a portion is "connected" to another portion, the portions may not only be "directly connected," but may also be "electrically connected" via another element. Also, it is to be understood that terms such as "including" or "having," etc., are intended to indicate the existence of the components disclosed in the specification, and are not intended to preclude the possibility that one or more other components may exist or may be added.

The expression "the" and similar referring expressions used in the present specification, in particular, in claims, may denote both singular and plural. Further, when there is no description explicitly specifying an order of operations describing a method according to the present disclosure, the operations may be performed in a suitable order. The present disclosure is not limited by the order of describing the operations.

The phrases "according to some embodiments," "according to an embodiment," and the like in various places in the present specification do not all necessarily refer to the same embodiment.

Some embodiments of the present disclosure may be represented by functional block components and various processing steps. Some or all of the functional blocks may be implemented with various numbers of hardware and/or software components configured to perform specified functions. For example, the functional blocks of the present disclosure may be embodied by at least one microprocessor or by circuit components for a certain function. Also, for example, the functional blocks of the present disclosure may be implemented using various programming or scripting languages. The functional blocks may be implemented with algorithms executed in at least one processor. Further, the present disclosure may employ the related art for electronic configuration, signal processing, and/or data processing.

Also, connection lines or connection members between components shown in the drawings are merely illustrative of functional connections and/or physical or circuit connections. In an actual apparatus, connections between components may be represented by various functional connections, physical connections, or circuit connections that may be replaced or added.

In the present specification, the term "application" may denote a program prepared to perform a specific task or a specific function. An electronic apparatus may execute the application via an operating system (OS). In executing of the application, the OS of the electronic apparatus may receive a user input from a user, transmit the user input to the application, and transmit an output of the application to the user.

In the specification, a virtual application called a "video watching application" capable of reproducing content is described as an example, but embodiments of the disclosure are not limited thereto. Examples of an application executable by the electronic apparatus, according to an embodiment, may include an application for reproducing content, an application for reserving a performance, such as a movie or a play, an application for financial transaction, and an application for providing a navigation function.

In the present specification, a "page" may denote a basic frame of a screen displayable by an electronic apparatus when an application is executed. The page of the application may include not only various types of text, but also an image, sound, a video, a file, etc., and may include a user interface (UI) connecting the page to another page. The page may include at least one region for displaying an image or text, and another image or text may be displayed in the region according to data processed by the application.

For example, the application for reproducing content may include a page for searching for content. The electronic apparatus may display a screen corresponding to the page for searching for content by executing the application. At this time, screens being displayed may vary according to an input search word, found content, and the like.

In the present specification, a "virtual input" may denote an input generated by an electronic apparatus, instead of an input received from a user. An electronic apparatus capable of executing an application may generate a virtual input and transmit the generated virtual input to the application. Upon receiving the virtual input, the application may operate as if a user input is received from the user.

In the present specification, a "virtual input sequence" may denote virtual inputs having an order. The virtual input sequence may include virtual inputs generated by an electronic apparatus, which cause an application to be executed as if the electronic apparatus received user inputs with respect to the application from a user through a user input device.

Hereinafter, the present disclosure will be described in detail with reference to the accompanying drawings.

FIGS. 1A and 1B illustrate screens on which an application that does not support voice control is executed by an electronic apparatus.

FIG. 1A illustrates a home screen 110 displayed by an electronic apparatus. Icons corresponding to various applications may be displayed on the home screen 110 of the electronic apparatus. A user may select an icon 111 corresponding to a video watching application to control the electronic apparatus to execute the video watching application.

When the electronic apparatus supports a voice recognition function, the user may start the video watching application by using a voice command without a physical operation of selecting the icon 111. However, when an application programming interface (API) of the video watching application is not open, it is difficult to control an operation after starting of the application.

For example, as shown in FIG. 1A, the electronic apparatus may start the video watching application when a voice command of "play Love Story from video watching application" is received from the user. The electronic apparatus may display a start screen 120 of the video watching application when the video watching application is started. The electronic apparatus may display a screen 130 for selecting a profile of the user when a certain period of time is passed after the start screen 120 is displayed or when a specific user input is received from the user.

Referring to the voice command of the user, it is determined that the user wished to watch a movie titled Love Story through the video watching application. However, as shown in FIG. 1A, when the video watching application does not support the voice control, the electronic apparatus may stop an operation of the application after displaying profile selection screen 130 despite the voice command of the user.

Meanwhile, FIG. 1B illustrates a case in which the electronic apparatus executes the video watching application to display a screen 140 displaying detailed information about content called Ghost Story. The electronic apparatus may receive a voice command of "play Love Story" from the user while displaying the content information displaying screen 140. In FIG. 1B, the video watching application does not support the voice control and the API of the video watching application is not open. As shown in FIG. 1B, because the video watching application does not support the voice control, the video watching application is not executed in response to the voice command of the user. Accordingly, the application may not perform an operation corresponding to the voice command even after the electronic apparatus received the voice command of the user. The electronic apparatus may display a screen 150 identical to the screen 140 before the voice command is received.

In order for a user to control an application that does not support voice control via a voice command, a general electronic apparatus may recognize text displayed on a screen displayed thereon. The general electronic apparatus may select an icon including text included in the voice command to control the application based on the voice command of the user. However, as shown in FIGS. 1A and 1B, when a voice command including text that is not displayed on a screen is received from the user, the general electronic apparatus is unable to execute the application in response to the received voice command.

Accordingly, a method and electronic apparatus capable of controlling an application that does not support voice control, in response to a voice command of a user even when an API of the application is not open are required. Also, a method and electronic apparatus enabling a user to control an application by using a voice command including text that is not displayed on a screen are required.

Figure 2A:
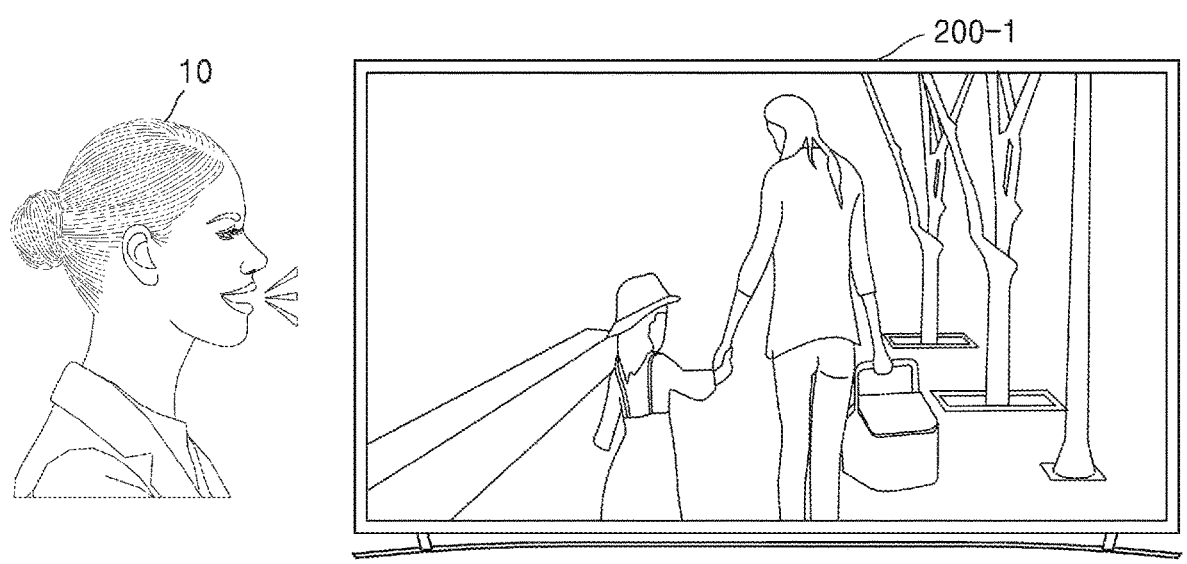
FIGS. 2A and 2B are diagrams for describing a voice recognition system according to various embodiments of the disclosure.
Figure 2B:
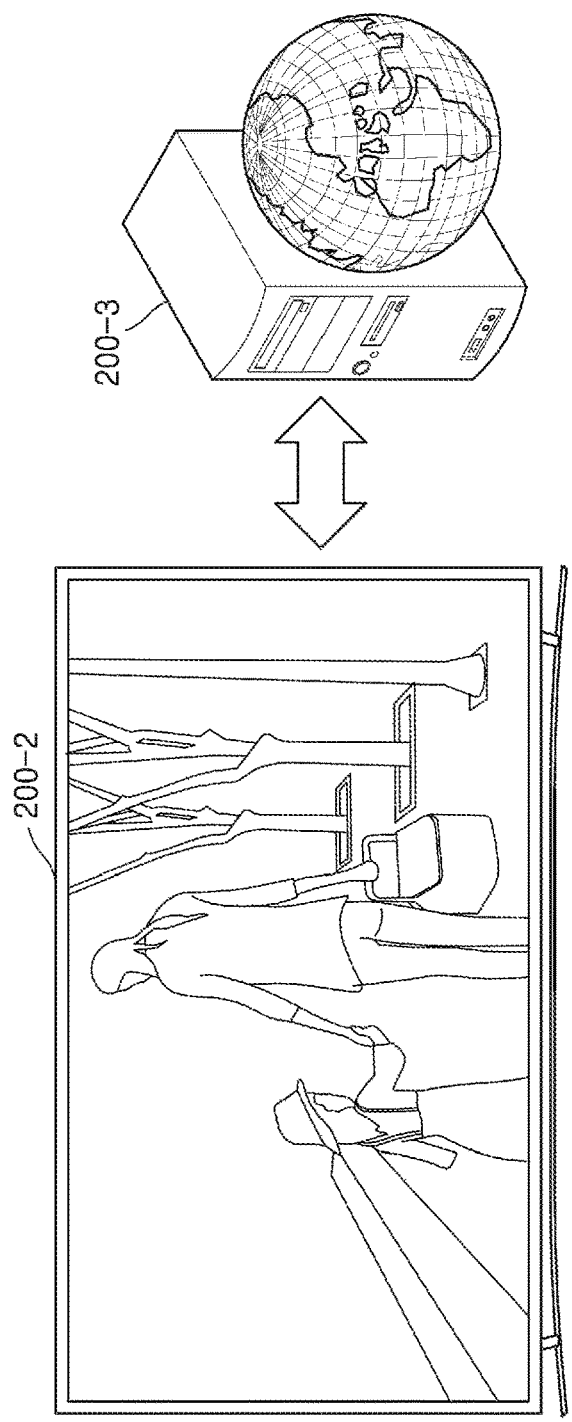
Figure 2B:
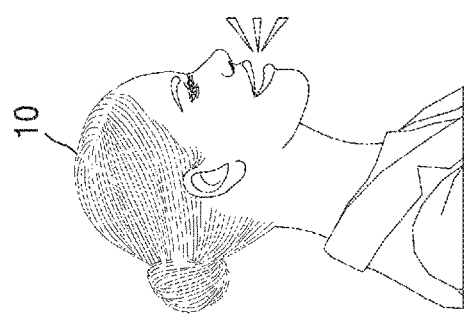

FIGS. 2A and 2B are diagrams for describing a voice recognition system according to an embodiment.

As shown in FIG. 2A, the voice recognition system according to an embodiment of the disclosure may include an electronic apparatus 200-1. Examples of the electronic apparatus 200-1 include a smart television (TV), a smart phone, a tablet personal computer (PC), a PC, a personal digital assistant (PDA), a laptop computer, a media player, a micro-server, a globing positioning system (GPS) apparatus, an electronic book terminal, a digital broadcasting terminal, a navigation device, a kiosk, an MP3 player, a digital camera, and other mobile or non-mobile computing devices, but are not limited thereto.

The electronic apparatus 200-1 according to an embodiment of the disclosure may receive a voice command of a user 10 and perform voice recognition on the voice command. The electronic apparatus 200-1 may generate a virtual input sequence to perform an operation corresponding to the voice command, based on a result of the voice recognition. The electronic apparatus 200-1 may execute an application in response to the virtual input sequence.

Also, as shown in FIG. 2B, the voice recognition system according to an embodiment of the disclosure may include an electronic apparatus 200-2 and a server 200-3. The electronic apparatus 200-2 and the server 200-3 may be connected via wires or wirelessly.

The electronic apparatus 200-2 and the server 200-3 according to an embodiment of the disclosure may share data. The electronic apparatus 200-2 according to an embodiment of the disclosure may receive a voice command from the user 10. The electronic apparatus 200-2 may transmit a voice signal including the voice command to the server 200-3. Alternatively, the electronic apparatus 200-2 may transmit a feature vector of the voice signal, which is detected from the voice signal, to the server 200-3.

The server 200-3 may perform voice recognition based on a signal received from the electronic apparatus 200-2. For example, the server 200-3 may perform voice recognition on the voice signal received by the electronic apparatus 200-2 from the user. The server 200-3 may generate a virtual input sequence to cause the electronic apparatus 200-2 to perform an operation corresponding to the voice command by executing an application, based on a result of the voice recognition. The server 200-3 may transmit the generated virtual input sequence to the electronic apparatus 200-2. The electronic apparatus 200-2 may execute an application in response to the virtual input sequence.

As shown in FIGS. 2A and 2B, the voice recognition system according to an embodiment of the disclosure may include at least one electronic apparatus and may further include at least one server. Hereinafter, for convenience of description, a voice recognition method performed by an "electronic apparatus" will be described. However, some or all operations of the electronic apparatus described hereinafter may be performed by a server, or may be partially performed by a plurality of electronic apparatuses or a plurality of servers.

Figure 3A:
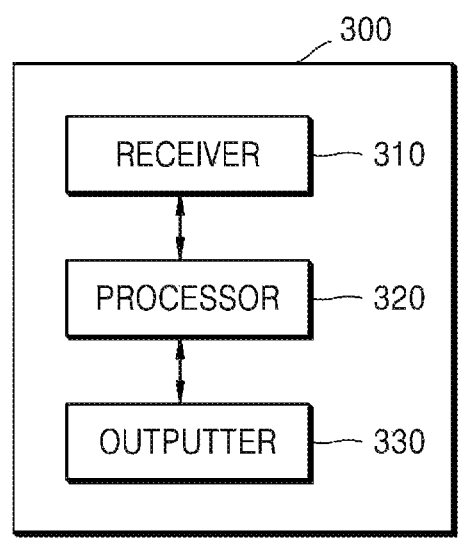
FIGS. 3A and 3B are block diagrams of an electronic apparatus according to various embodiments of the disclosure.
Figure 3B:
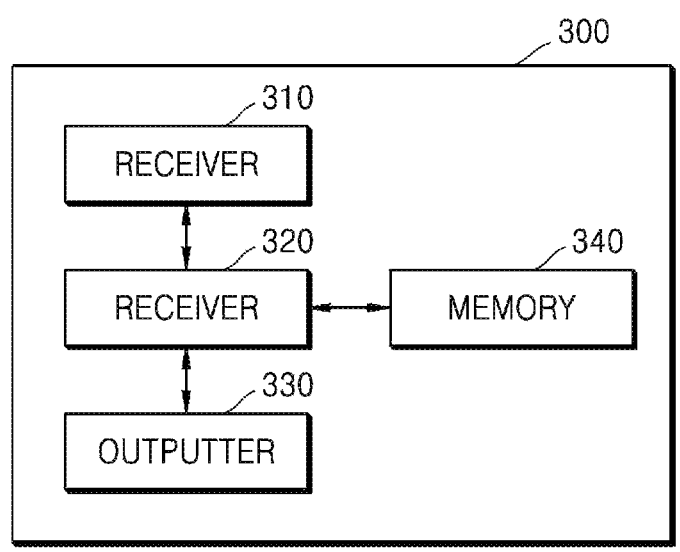

FIGS. 3A and 3B are block diagrams of an electronic apparatus according to an embodiment.

As shown in FIG. 3A, an electronic apparatus 300 according to an embodiment of the disclosure may include a receiver 310, a processor 320, and an outputter 330. However, the electronic apparatus 300 may be embodied by components more than those shown in FIG. 3A. For example, as shown in FIG. 3B, the electronic apparatus 300 according to an embodiment of the disclosure may further include a memory 340.

For example, the electronic apparatus 300 according to an embodiment of the disclosure may be included in at least one of a home appliance, a mobile computing device, or a server, or may be configured to be connected to at least one of a home appliance, a mobile computing device, or a server via wires or wirelessly. The electronic apparatus 300 of FIG. 3A or 3B may correspond to the electronic apparatus 200-1 or 200-2 or the server 200-3 of FIG. 2A or 2B.

The receiver 310 may receive a voice command of a user. For example, the receiver 310 may directly receive the voice command by converting eternal sound to electric sound data via a microphone. Alternatively, the receiver 310 may receive the voice command transmitted from an external apparatus. In FIG. 3A, it is illustrated that the receiver 310 is included inside the electronic apparatus 300, but the receiver 310 according to another embodiment of the disclosure may be included in a separate apparatus and connected to the electronic apparatus 300 via wires or wirelessly.

The receiver 310 may activate a session for receiving the voice command, based on control of the processor 320. According to an embodiment, a session may denote a time from when an operation of the electronic apparatus 300 receiving the voice command is started to when the operation is ended. The activating of the session may mean that the electronic apparatus 300 starts the operation of receiving the voice command. The receiver 310 may transmit the voice command input while the session is maintained to the processor 320.

Also, the receiver 310 according to an embodiment of the disclosure may receive a user input for controlling the electronic apparatus 300. The receiver 310 may include a user input device including a touch panel for receiving a user's touch, a button for receiving a push manipulation of the user, a wheel for receiving a rotation manipulation of the user, a keyboard, a dome switch, and the like, but is not limited thereto. The receiver 310 may receive a user input not directly, but through a separate user input device.

The processor 320 may perform voice recognition on the voice command input from the receiver 310. The processor 320 may include at least one processor. According to an embodiment, the processor 320 may extract waveform characteristics of a voice signal from the voice command, and perform voice recognition by using a sound model and a language model. The waveform characteristics may include information about a change and periodicity of a waveform extractable from a sound input along a time axis. Thus, as shown in FIG. 3B, the electronic apparatus 300 may further include the memory 340 storing the sound model and the language model.

According to an embodiment, the processor 320 may perform the voice recognition on the voice command. The processor 320 may generate a virtual input sequence corresponding to the voice command, based on a result of the voice recognition. The processor 320 may determine a target page among a plurality of pages displayable when an application is executed. The processor 320 may determine a page for performing an operation corresponding the voice command as the target page among the plurality of pages.

The processor 320 may generate a virtual sequence for displaying a second screen corresponding to the target page, instead of a first screen currently displayed. The processor 320 may execute the application in response to the virtual input sequence.

The outputter 330 may output the result of performing the voice recognition on the voice command According to an embodiment, the outputter 330 may notify a result of performing the voice command or transmit the result to an external device (for example, a smart phone, a smart TV, a smart watch, a server, or the like). For example, the outputter 330 may include a display capable of outputting an image signal.

Alternatively, according to an embodiment, the outputter 330 may perform the operation corresponding to the voice command. For example, the electronic apparatus 300 may transmit an input keyword to a server to search for particular content in response to the voice command. Alternatively, the electronic apparatus 300 may output a screen for reproducing found content through the outputter 330.

The memory 340 of FIG. 3B may store the result of the processor 320 performing the voice recognition. The memory 340 may store information related to characteristics of each of the plurality of pages displayable when the application is executed. The information related to the characteristics of each of the plurality of pages may include information about a size, color of UI displayed on each page, text, sign included in the UI, and metadata related to the UI. Also, the memory 340 may store a tree structure of the plurality of pages. The memory 340 storing the tree structure of the plurality of pages may store information about pages adjacent to each page and information related to a user input for movement between pages.

The block diagrams of FIGS. 3A and 3B may also be applied to a server. A server according to an embodiment of the disclosure may include a receiver configured to receive information about a voice command of a user from an electronic apparatus. The server may communicate with the electronic apparatus by being connected thereto via wires or wirelessly. The voice command received by the receiver of the server may be that received by the electronic apparatus.

Also, the server may include a processor and an outputter, and may further include a memory. The processor of the server may perform voice recognition on the voice command. The processor of the server may generate a virtual input sequence for controlling an operation corresponding to the voice command to be performed when an application is executed by the electronic apparatus.

The processor of the server may determine a target page among a plurality of pages displayable when the application is executed by the electronic apparatus, based on a result of the voice recognition. The electronic apparatus may determine a page for performing the operation corresponding to the voice command as the garget page. The processor of the server may generate a virtual input sequence for controlling the electronic apparatus to display a second screen corresponding to the target page, instead of a first screen currently displayed by the electronic apparatus.

The outputter of the server may transmit the virtual input sequence to the electronic apparatus. The electronic apparatus may execute the application in response to the virtual input sequence received from the server.

Hereinafter, an operating method of the electronic apparatus 300, according to an embodiment of the disclosure will be described in detail. Each operation of the method described below may be performed by each component of the electronic apparatus 300 described above with reference to FIGS. 3A and 3B. For convenience of description, a case in which the electronic apparatus 300 is a subject of operations is described as an example, but the descriptions below may be applied to a case in which the server is a subject of operations.

Figure 4:
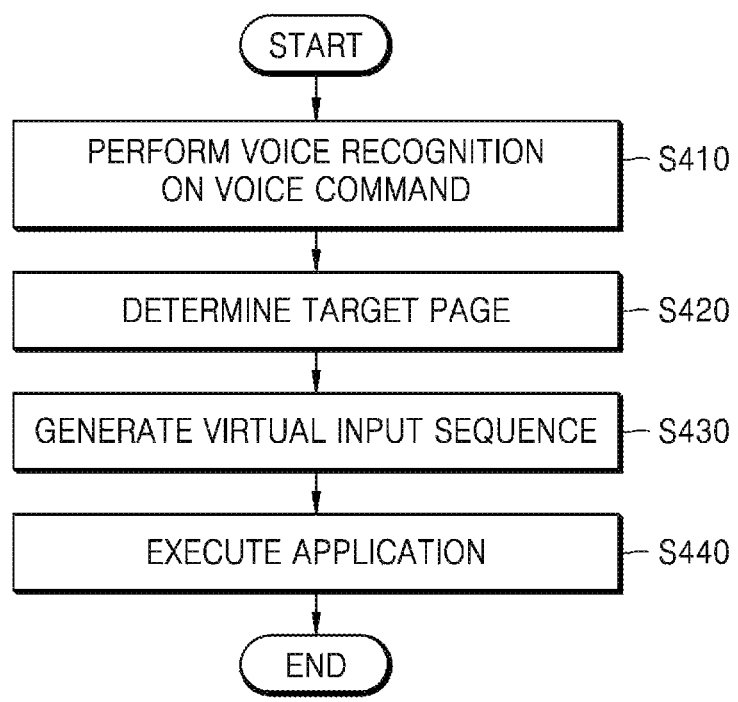
FIG. 4 is a flowchart of a method, performed by an electronic apparatus, of executing an application, according to various embodiments of the disclosure.

FIG. 4 is a flowchart of a method of executing an application, according to an embodiment.

In operation S410, the electronic apparatus 300 may perform voice recognition on a voice command for executing an application.

According to an embodiment, the electronic apparatus 3300 may determine an intention of the voice command via natural language processing. For example, the electronic apparatus 300 may translate the voice command of a user to a machine language that is a language interpreted by the electronic apparatus 300, by performing the voice recognition. The electronic apparatus 300 according to an embodiment of the disclosure may extract an operation desired by the user to be performed by the application, the application that is a subject of the operation, and an object that is a target of the operation from the voice command, by performing the voice recognition.

The electronic apparatus 300 according to an embodiment of the disclosure may extract at least one word from text generated by converting the voice command. The electronic apparatus 300 may extract a first word related to the operation, from the text generated by converting the voice command. The electronic apparatus 300 may extract a second word related to the object that is the target of the operation from the text generated by converting the voice command.

For example, the electronic apparatus 300 may receive the voice command of "play Love Story from video watching application" of the user. The electronic apparatus 300 may extract a word related to an operation, i.e., "play," a word related to a subject of the operation, i.e., "video watching application," and a word related to an object that is a target of the operation, i.e., "Love Story" from the text generated by converting the voice command. The electronic apparatus 300 may determine that the user wants an electronic apparatus to execute the video watching application and to reproduce content called Love Story through the video watching application.

In operation S420, the electronic apparatus 300 may determine a target page among a plurality of pages displayable when an application is executed, based on a result of the voice recognition.

According to an embodiment, the electronic apparatus 300 may extract a characteristic of at least one UI displayed on a screen by analyzing a first screen currently displayed. The electronic apparatus 300 may determine a version of the application installed in the electronic apparatus, based on at least one of a size, color of the UI displayed on the first screen, text, sign included in the UI, or metadata related to the UI. Alternatively, the electronic apparatus 300 may determine the version of the application based on pre-stored metadata of the application.

The electronic apparatus 300 may obtain information about a plurality of pages, based on the determined version. The information about the plurality of pages may include information related to a characteristic of each of the plurality of pages. The information related to the characteristic of the page may include a characteristic of at least one UI displayed on a screen or a layout of the screen, when the screen corresponding to the page is displayed. The characteristic of the UI may include at least one of the size, color of the UI, the text, sign included in the UI, or the metadata related to the UI. Also, the information about the plurality of pages may include information about to which pages each page is connected and information about user inputs to be input for movement between pages.

The electronic apparatus 300 may obtain the information about the plurality of pages pre-stored in the electronic apparatus 300. Alternatively, the electronic apparatus 300 may obtain the pre-stored information about the plurality of pages from a server connected to the electronic apparatus 300 via wires or wirelessly. The information about the plurality of pages of the application will be described in detail later with reference to FIGS. 8 and 9.

Also, the electronic apparatus 300 may identify which page is a current screen among the plurality of pages of the application, based on the characteristic of the at least one UI displayed on the first screen. The electronic apparatus 300 may determine a first page corresponding to the first screen among the plurality of pages.

The electronic apparatus 300 may determine a target page corresponding to the voice command, based on a result of performing the voice recognition. The target page determined according to an embodiment of the disclosure may be a page causing the application to perform an operation intended by the voice command. For example, when the voice command of "play Love Story from vide watching application," the electronic apparatus 300 may determine a page capable of reproducing content called Love Story as the target page.

The electronic apparatus 300 may determine the target page among the plurality of pages, based on the result of the voice recognition and the information related to the characteristic of each of the plurality of pages. For example, when the first word related to the operation of the application or the object that is the target of the operation is extracted from the voice command, the electronic apparatus 300 may determine, as the target page among the plurality of pages, a page including at least one of text, metadata, or icon corresponding to the first word. The electronic apparatus 300 may identify to which operation of the application an icon included in each page is related, based on the information related to the characteristic of each of the plurality of pages.

In operation S430, the electronic apparatus 300 may generate a virtual input sequence.

The virtual input sequence may include virtual inputs generated by the electronic apparatus 300, which causes the electronic apparatus to execute the application as if user inputs with respect to the application are received from the user through a user input device. The virtual input sequence may include a plurality of virtual inputs in order (sequentially).

The electronic apparatus 300 may generate the virtual input sequence, based on at least one of the result of the voice recognition or the determined target page. The electronic apparatus 300 may generate the virtual input sequence for displaying a second screen corresponding to the target page, instead of the first page currently displayed. The virtual input sequence generated by the electronic apparatus 300 may further include a virtual input causing the operation corresponding to the voice command to be performed on the target page. The electronic apparatus 300 may execute the application in response to the generated virtual input.

The electronic apparatus 300 may obtain information about to which pages each of the plurality of pages is connected, from the information about the plurality of pages obtained in operation S420. According to an embodiment of the disclosure, the meaning that pages are connected is that a screen corresponding to another page may be displayed when text or an icon included in a certain page is selected. The electronic apparatus 300 may generate the virtual input sequence for moving from the first page corresponding to the first screen to the target page, based on connection information between the pages. For example, the virtual input sequence may include the plurality of virtual inputs for moving from the first page to the target page through at least one second page.

According to an embodiment of the disclosure, the electronic apparatus 300 may determine a path for moving from the first page corresponding to the first screen to the target page within a graph structure of the plurality of pages with respect to the application. The graph structure of the plurality of pages may denote a structure of a relation between pages and a relation between items in each page. The electronic apparatus 300 may determine a path determined to be an optimum path among a plurality of paths for moving from the first page to the target page. The optimum path for moving from the first page to the target page may be a shortest path or a path pre-learned to be a path frequently used by the user.

According to an embodiment, the electronic apparatus 300 may generate the virtual input sequence including virtual inputs corresponding to user inputs to be input for moving between pages included in the determined path. For example, the virtual input sequence may include a plurality of virtual inputs for moving from the first page to the target page through at least one second page, within the graph structure.

Before operation S410, the electronic apparatus 300 may learn a pattern of the user inputting a user input to control the application. While the application is executed, the electronic apparatus 300 may store information about the user input received from the user to move from the first page corresponding to the first screen to the target page. The electronic apparatus 300 may generate a virtual input corresponding to the pre-learned user input, based on information about the pre-learned user input. The application may be executed by the virtual input as if the pre-learned user input is received from the user. A method of learning a user input pattern will be described in detail later with reference to FIG. 10.

In operation S440, the electronic apparatus 300 may execute the application in response to the virtual input sequence.

According to an embodiment, the electronic apparatus 300 may execute the application in response to a first virtual input included in the virtual input sequence. The electronic apparatus 300 may switch a screen being displayed by executing the application in response to the first virtual input. The electronic apparatus 300 may analyze a UI on the screen whenever the screen is switched. The electronic apparatus 300 may determine whether the application is properly performed according to the determined path from the first page to the target page, based on a result of the analysis.

For example, the electronic apparatus 300 may display a third screen instead of the first screen by executing the application in response to the first virtual input included in the virtual input sequence. The electronic apparatus 300 may determine whether the third screen is a screen corresponding to the at least one second page, based on a characteristic of a UI displayed on the third screen. The at least one second page may be a page included in the path determined for moving from the first page to the target page, within the tree structure of the plurality of pages of the application.

The electronic apparatus 300 may determine that the application is properly performed according to the determined path from the first page to the target page, when the third screen is the screen corresponding to the at least one second page. When it is determined that the application is properly performed according to the determined path from the first page to the target page, the electronic apparatus 300 may execute the application in response to a second virtual input included in the virtual input sequence after the first virtual input. According to an embodiment, the electronic apparatus 300 may display the second screen corresponding to the target page, instead of the third screen, by executing the application in response to the second virtual input.

On the other hand, the electronic apparatus 300 may determine that the application is not properly performed according to the determined path from the first page to the target page, when the third screen is not the screen corresponding to the at least one second page. When it is determined that the application is not properly performed according to the determined path from the first page to the target page, the electronic apparatus 300 may update the information about the plurality of pages of the application. Alternatively, when it is determined that the application is not properly performed according to the determined path from the first page to the target page, the electronic apparatus 300 may stop an operation of the application or display the screen where the voice command is received again.

The electronic apparatus 300 may display the second screen corresponding to the target page and control the application to perform the operation corresponding to the voice command on the target page. According to an embodiment, the electronic apparatus 300 may generate the virtual input causing the application to perform the operation corresponding to the voice command. The electronic apparatus 300 may execute the application in response to the generated virtual input.

For example, when a voice command of reproducing certain content via an application is received from the user, the electronic apparatus 300 may execute the application as follows. The electronic apparatus 300 may display a third screen for searching for content reproducible by the application by executing the application in response to a first virtual input included in a virtual input sequence. The electronic apparatus 300 may input an identifier of the certain content into a search window displayed on the third screen by executing the application in response to a second virtual input included in the virtual input sequence. The identifier of the certain content may include, for example, a name, an identification number, a category, or the like of the certain content. The electronic apparatus 300 may search for the certain content by executing the application, based on the input identifier. The electronic apparatus 300 may display a second screen corresponding to a target page for reproducing the certain content, based on a result of the searching. The electronic apparatus 300 may control the application to perform an operation corresponding to the voice command on the target page. According to an embodiment, the electronic apparatus 300 may generate a third virtual input for reproducing the certain content. The electronic apparatus 300 may reproduce the certain content by executing the application in response to the third virtual input.

Meanwhile, the electronic apparatus 300 may prevent occurrence of interrupt by the application or the user while controlling the application according to the voice command of the user by performing operations S410 through S440 of FIG. 4. For example, the electronic apparatus 300 may restrict a user input from being received from the user or restrict the application from providing a notification to the user while driving a voice control function by the voice command of the user.

Figure 5:
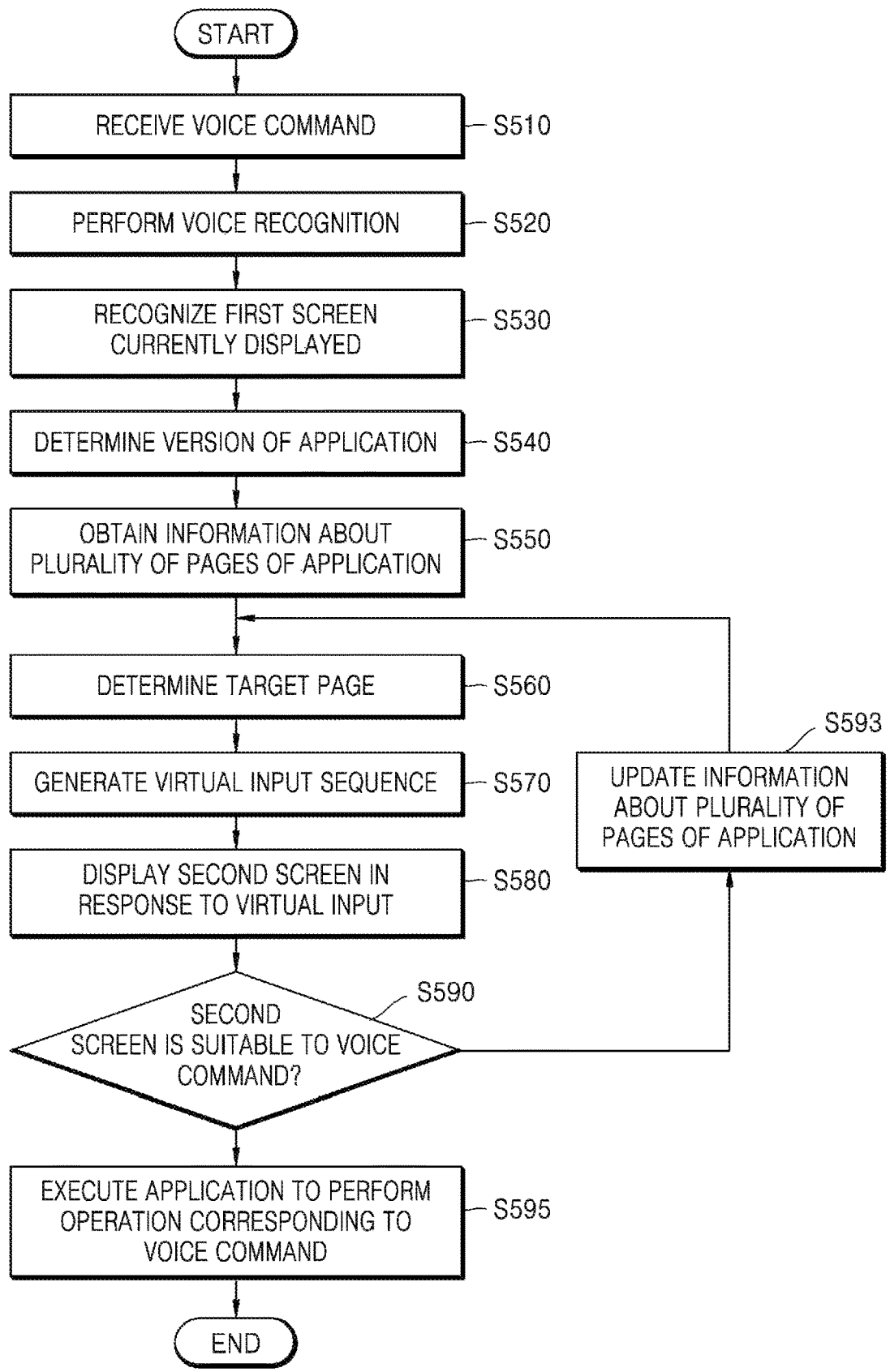
FIG. 5 is a detailed flowchart of a method, performed by an electronic apparatus, of executing an application, according to various embodiments of the disclosure.

FIG. 5 is a detailed flowchart of a method of executing an application, according to an embodiment.

Operations S510 and S520 of FIG. 5 may correspond to operation S410 of FIG. 4, and operations S530, S540, S550, and S560 of FIG. 5 may correspond to operation S420 of FIG. 4. Operation S570 of FIG. 5 may correspond to operation S430 of FIG. 4. Operations S550, S560, and S580 of FIG. 5 may correspond to operation S440 of FIG. 4. For each operation of FIG. 4 and each operation of FIG. 5, which correspond to each other, details about each operation may be applied to its correspondent. Thus, redundant descriptions of corresponding operations will be omitted.

In operation S510, the electronic apparatus 300 may receive a voice command from a user.

In operation S520, the electronic apparatus 300 may perform voice recognition on the voice command.

In operation S530, the electronic apparatus 300 may recognize a first screen currently displayed. The electronic apparatus 300 may recognize the first screen by analyzing a characteristic of a UI displayed on the first screen.

In operation S540, the electronic apparatus 300 may determine a version of an application. The electronic apparatus 300 may determine the version of the application, based on the characteristic of the UI displayed on the first screen. Alternatively, the electronic apparatus 300 may determine the version of the application, based on pre-stored metadata of the application.

The electronic apparatus 300 may distinguish and pre-store information about a plurality of pages displayable when the application of a respective version is executed, according to versions of the application. The electronic apparatus 300 may determine the version of the application installed in the electronic apparatus 300 by comparing a result of analyzing the first screen and the pre-stored information about the plurality of pages.

In operation S550, the electronic apparatus 300 may obtain the information about the plurality of pages of the application, based on the determined version. The electronic apparatus 300 may recognize which one of the plurality of pages of the application is the first screen currently displayed. The electronic apparatus 300 may determine that a first page among the plurality of pages corresponds to the first screen.

In operation S570, the electronic apparatus 300 may generate a virtual input sequence for displaying a second screen corresponding to a target page, instead of the first screen currently displayed. The electronic apparatus 300 may determine a path for moving from the first page corresponding to the first screen to the target page, within the plurality of pages having a tree structure. The electronic apparatus 300 may obtain information about at least one user input to be input for moving from the first page to the target page, according to the determined path. The electronic apparatus 300 may generate the virtual input sequence including at least one virtual input corresponding to the at least one user input, based on the obtained information about the at least one user input. The generated virtual input sequence may further include a virtual input causing the application to perform an operation corresponding to the voice command on a screen corresponding to the target page.

In operation S580, the electronic apparatus 300 may display the second screen by executing the application in response to the virtual input included in the virtual input sequence.

In operation S590, the electronic apparatus 300 may determine whether the second screen is suitable to the voice command. The electronic apparatus 300 may determine whether the second screen is a screen corresponding to a page included in the path determined in operation S570. When the second screen is the screen corresponding to the page included in the path determined in operation S570, the electronic apparatus 300 may determine that the second screen is the screen suitable to the voice command. When the second screen is not the screen corresponding to the page included in the path determined in operation S570, the electronic apparatus 300 may determine that the second screen is not the screen suitable to the voice command.

When it is determined that the second screen is the screen suitable to the voice command, the electronic apparatus 300 may execute the application to perform the operation corresponding to the voice command, in operation S595.

When it is determined that the second screen is not the screen suitable to the voice command, the electronic apparatus 300 may update the information about the plurality of pages of the application, in operation S593. When the second screen is not the screen corresponding to the page included in the path determined in operation S570, a version of the application installed in the electronic apparatus 300 may be different from the version determined in operation S540. Accordingly, the electronic apparatus 300 may receive and store information about the plurality of pages corresponding to the version of the application currently installed, via communication with a server.

In FIG. 5, for convenience of description, an example in which the electronic apparatus 300 immediately switches from the first screen to the second screen corresponding to the target page is described. However, embodiments of the disclosure are not limited thereto. The electronic apparatus 300 according to an embodiment of the disclosure may determine a path moving from the first page corresponding to the first screen to the target page through the at least one second page, within the tree structure of the plurality of pages of the application. In this case, the electronic apparatus 300 may analyze the UI on the screen whenever the screen is switched in response to the virtual input included in the virtual input sequence.

When the screen being switched to is the screen corresponding to the page included in the path determined in operation S570, the electronic apparatus 300 may execute the application in response to a next virtual input of the input virtual input. On the other hand, when the screen being switched to is not the screen corresponding to the page included in the shortest path determined in operation S570, the electronic apparatus 300 may update the information about the plurality of pages of the application. Alternatively, when the screen being switched to is not the screen corresponding to the page included in the shortest path determined in operation S570, the electronic apparatus 300 may stop the operation of the application.

As shown in FIGS. 4 and 5, the electronic apparatus 300 according to an embodiment of the disclosure may generate the virtual input sequence by determining an intention of utterance of the user even when the user utters the voice command including text that is not displayed on the screen.

Accordingly, the user of the electronic apparatus 300 may control the application that does not support voice control, by using the voice command.

Figure 6A:
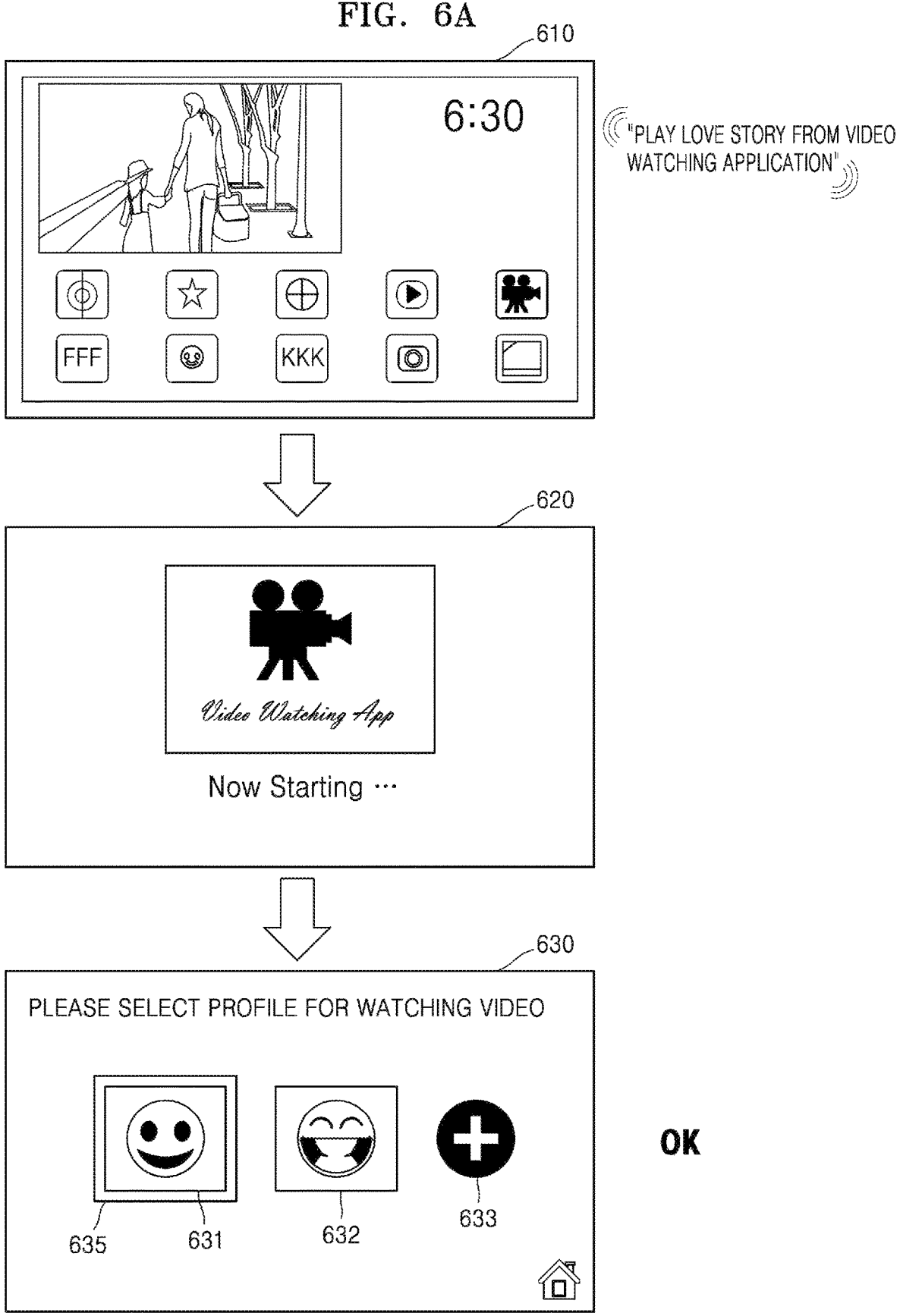
FIGS. 6A, 6B, and 6C illustrate examples of screens displayed by an electronic apparatus, according to various embodiments of the disclosure.
Figure 6B:
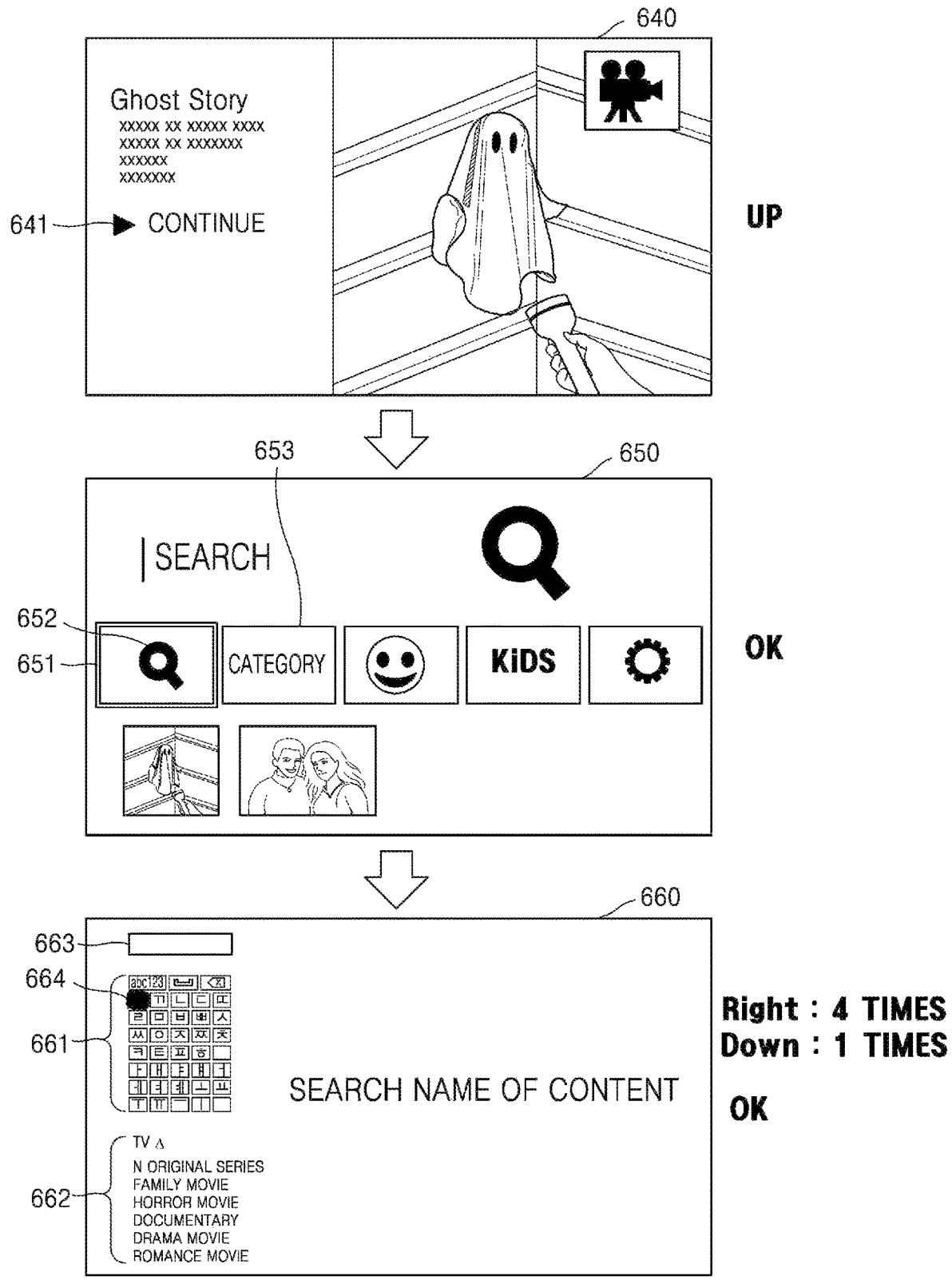
Figure 6C:
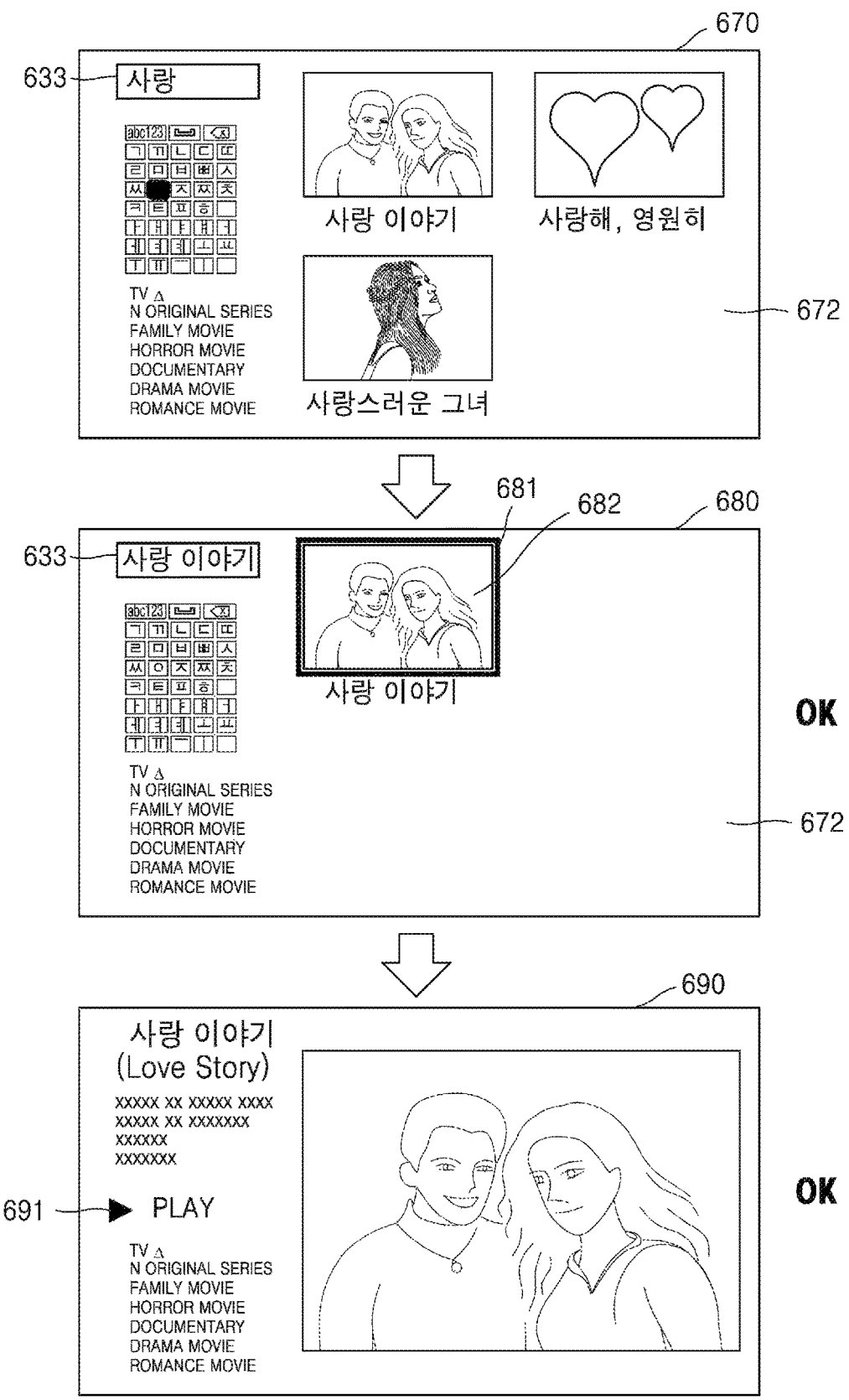

FIGS. 6A, 6B, and 6C illustrate examples of screens displayed by an electronic apparatus, according to an embodiment.

FIG. 6A illustrates a home screen 610 displayed by the electronic apparatus 300. In FIG. 6A, an example in which a voice command is received from a user when the electronic apparatus 300 displays the home screen 610 is illustrated. For example, the home screen 610 may be a home screen of a smart TV platform. However, embodiments of the disclosure are not limited thereto. The electronic apparatus 300 according to an embodiment of the disclosure may receive the voice command for executing an application from the user in various cases, for example, when a home screen is displayed, when a screen executing the application that is a target of the voice command is displayed, when a screen executing another application is displayed, and the like.

The electronic apparatus 300 may receive a voice command of "play Love Story from video watching application" from the user. By performing voice recognition on the voice command, the electronic apparatus 300 may determine that the user wants the electronic apparatus 300 to execute the video watching application and reproduce content called Love Story.

The electronic apparatus 300 may generate a virtual input sequence for performing an operation corresponding to the voice command of the user through the application. The electronic apparatus 300 may generate the virtual input sequence suitable to a situation by using an API of an auto-input package, and transmit the generated virtual input sequence to the application.

The electronic apparatus 300 may start the video watching application in response to the voice command. While starting the video watching application, the electronic apparatus 300 may display a start screen 620. The application driven through the electronic apparatus 300 may display a screen 630 for selecting a profile of the user after displaying the start screen 620.

The electronic apparatus 300 may determine a page capable of reproducing content as a target page among a plurality of pages displayable when the application is executed. The electronic apparatus 300 may determine to which page the screen 630 corresponds to among the plurality of pages, by analyzing at least one of sizes, colors, texts, signs, or metadata of icons 631 through 634 displayed on the screen 630. For example, the electronic apparatus 300 may determine that the screen 630 corresponds to a first page for selecting a profile of the user among the plurality of pages of the application. The electronic apparatus 300 may generate a virtual input sequence for displaying a second screen corresponding to a target page instead of the first screen 630 being displayed and performing an operation corresponding to the voice command The electronic apparatus 300 may generate the virtual input sequence including virtual inputs for moving from the first page to the target page.

In FIGS. 6A through 6C, an example in which a user input is received by a remote controller including four arrow buttons and an OK button is illustrated. However, various embodiments are not limited by the illustrated example. The electronic apparatus 300 may generate the virtual input sequence causing the application to be executed as if user inputs are received through various user input devices in addition to the remote controller.

Referring to FIG. 6A, the virtual input sequence generated by the electronic apparatus 300 may include a virtual input "OK."

The electronic apparatus 300 displaying the screen 630 may execute the application in response to the virtual input OK. The virtual input sequence may include the virtual input OK such that the application is executed as if the user pressed the OK button to select the icon 631 where a cursor 635 is positioned. In response to the virtual input OK, the electronic apparatus 300 that executed the application may display a screen 640 shown in FIG. 6B. The screen 640 may display a UI 641 enabling a user having a profile corresponding to the icon 631 selected on the screen 630 of FIG. 6A to continue watching previous content.

The electronic apparatus 300 may analyze a UI on a screen whenever the screen is switched. The electronic apparatus 300 may determine whether an application is properly performed according to a path determined from a first page to a target page, based on a result of the analyzing. The electronic apparatus 300 may determine whether the screen being switched to is a screen corresponding to a page included in the determined path. When it is determined that the screen being switched to is the screen corresponding to the page included in the determined path, the electronic apparatus 300 may execute the application based on a next virtual input included in a virtual input sequence. However, when it is determined that the screen being switched to is not the screen corresponding to the page included in the determined path, the electronic apparatus 300 may stop an operation of the application or return to a screen where a voice command is received. Alternatively, the electronic apparatus 300 may update information about a plurality of pages of the application.

Referring to FIG. 6B, the virtual input sequence generated by the electronic apparatus 300 may include a virtual input "UP" after the virtual input "OK."

The electronic apparatus 30 displaying the screen 640 may execute the application in response to the virtual input "UP." The virtual input sequence may include the virtual input "UP" such that the application is executed as if the user pressed an "UP" button to receive a main menu screen 650 of the application, instead of the screen 640. The electronic apparatus 300 that executed the application in response to the virtual input "UP" may display the screen 650.

The virtual input sequence generated by the electronic apparatus 300 may include a virtual input "OK" after the virtual input "UP."

The electronic apparatus 300 displaying the screen 650 may execute the application in response to the virtual input "OK." The virtual input sequence may include the virtual input "OK" such that the application is executed as if the user pressed the OK button to select an icon 652 where a cursor 651 is positioned. The electronic apparatus 300 that executed the application in response to the virtual input "OK" may display a screen 660. The screen 660 may display a UI for searching for content to be viewed by the user. In particular, on the screen 660, a keyboard 661 for inputting a search word for searching for the content, an input window 663 displaying the input search word, and a list 662 of search words that are recently searched for may be displayed.

The virtual input sequence generated by the electronic apparatus 300 may include four virtual inputs "Right," a virtual input "Down," and a virtual input "OK" after the virtual input "OK."

The electronic apparatus 300 displaying the screen 660 may execute the application in response to the virtual inputs. The virtual input sequence may include the four virtual inputs "Right," the virtual input "Down," and the virtual input "OK" such that the application is executed as if the user pressed a right button four times, pressed a down button one time, and pressed the OK button to select "ㅅ" where a cursor is positioned so as to move a cursor 664 from "ㅣ" to "ㅅ." The electronic apparatus 300 may display "ㅅ" in the input window 663 by executing the application in response to the virtual inputs. A method of inputting a letter by using a keyboard displayed on a screen will be described in detail below with reference to FIGS. 7A and 7B.

The virtual input sequence generated by the electronic apparatus 300 may include virtual inputs for inputting a title of "사랑 이야기" into the input window 663, based on the voice command of the user.

Referring to FIG. 6C, the electronic apparatus 300 may display a screen 670 by executing the application such as to input "사랑" into the input window 663 in response to the virtual inputs included in the virtual input sequence. The application may search for content including letters input to the input window 663, based on the input letters, and display thumbnail images of found content in a search result window 672.

The electronic apparatus 300 may display a screen 680 of FIG. 6C by executing the application such that "사랑 이야기" that is the title of content included in the voice command of the user is all input to the input window 663 in response to the virtual inputs. The application may search for content having the title input to the input window 663, based on the input title, and display a thumbnail image 682 of found content in the search result window 672.

The virtual input sequence generated by the electronic apparatus 300 may include the virtual input "OK" after the virtual inputs for inputting "사랑 이야기."

The electronic apparatus 300 displaying the screen 680 may select the found content in response to the virtual input "OK." The virtual input sequence may include the virtual input "OK" such that the application is executed as if the user pressed the button "OK" to select the thumbnail image 682 where a cursor 681 is positioned. The electronic apparatus 300 that executed the application in response to the virtual input "OK" may display a screen 690. The screen 690 may display a UI 691 for reproducing selected content. The virtual input sequence generated by the electronic apparatus 300 may include a virtual input "OK" after the virtual input "OK" for selecting the found content.

The electronic apparatus 300 displaying the screen 690 may execute the application in response to the virtual input "OK." The virtual input sequence may include the virtual input "OK" such that the application is executed as if the user pressed the OK button to reproduce the content "사랑 이야기" on the screen 690. In response to the virtual input "OK," the electronic apparatus 300 executing the application may reproduce the content "사랑 이야기."

A case in which a virtual input for a keyboard is generated to search for content is illustrated in FIGS. 6B and 6C, but embodiments of the disclosure are not limited to FIGS. 6B and 6C. The electronic apparatus 300 may generate a virtual input sequence including virtual inputs for extracting a word that is an object of an operation from a voice command and immediately inputting the extracted word into the input window 663.

Also, in FIGS. 6A through 6C, a case in which a target page for reproducing content is reached through a page of searching for a name of the content is illustrated, but embodiments of the disclosure are not limited to FIGS. 6B and 6C. A path determined by the electronic apparatus 300 to move to the target page may vary according to pre-learned information, according to users, and according to voice commands. For example, the electronic apparatus 300 may determine a category of content and determine a path for moving to a target page for reproducing the content through a page displaying thumbnail images of a plurality of pieces of content corresponding to the category. In this case, the electronic apparatus 300 displaying the screen 650 of FIG. 6B may execute the application in response to a virtual input for selecting an icon 653 instead of the icon 652. The virtual input sequence generated by the electronic apparatus 300 may include a virtual input "Right" and a virtual input "OK" for the electronic apparatus 300 to display a screen related to the category of content instead of the screen 650 of FIG. 6B, instead of including a virtual input "OK" for the electronic apparatus 300 to display the screen 660 instead of the screen 650 of FIG. 6B.

Figure 7B:
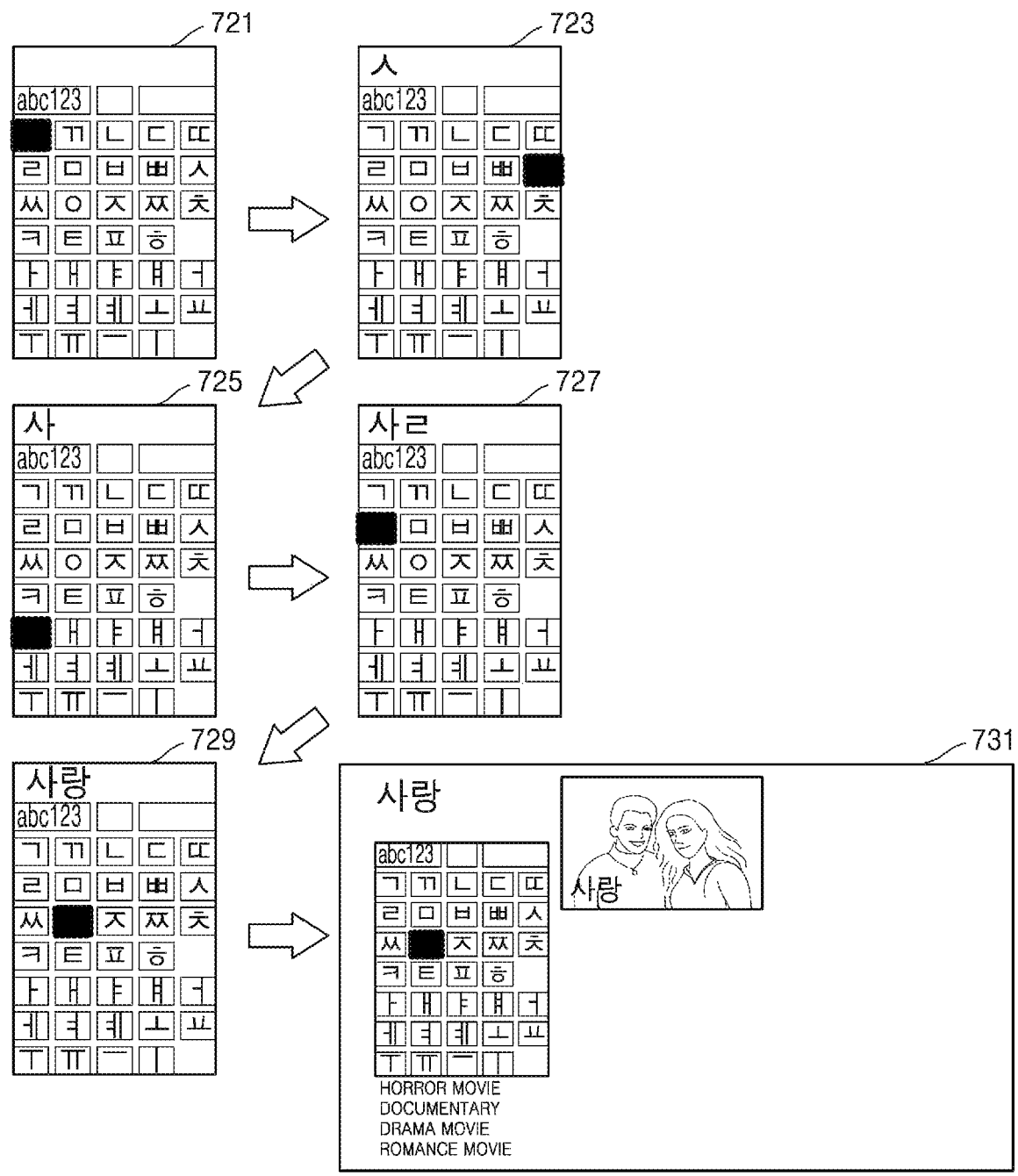

FIGS. 7A and 7B illustrate examples of a virtual input sequence generated by an electronic apparatus, according to an embodiment.

FIG. 7A illustrates an example of a virtual input sequence generated to input a letter input of "사랑" corresponding to a voice command of a user. An application may provide a keyboard on a screen so as to receive the letter input from the user. For example, the application may provide the keyboard as shown in an image 721 of FIG. 7B on the screen.

The electronic apparatus 300 displaying the image 721 of FIG. 7B may execute the application in response to virtual inputs 711 included in the virtual input sequence.

According to an embodiment, the electronic apparatus 300 may generate the sequence including the virtual inputs 711 of FIG. 7A such that the application is executed as if the user pressed a right button four times, a down button one time, and an OK button to move a cursor from "ㅣ" to "ㅅ" and select "ㅅ." The electronic apparatus 300 may display an image 723 displaying "ㅅ" in an input window by executing the application in response to the virtual inputs 711.

The electronic apparatus 300 displaying the image 723 of FIG. 7B may execute the application in response to virtual inputs 712 of FIG. 7A included in the virtual input sequence. The electronic apparatus 300 may generate the sequence including the virtual inputs 712 such that the application is executed as if the user pressed a left button four times, the down button three times, and the OK button to move the cursor from "ㅅ" to "ㅏ" and select "ㅏ." The electronic apparatus 300 may display an image 725 displaying "사" in the input window by executing the application in response to the virtual inputs 712.

The electronic apparatus 300 displaying the image 725 of FIG. 7B may execute the application in response to virtual inputs 713 of FIG. 7A included in the virtual input sequence. The electronic apparatus 300 may generate the sequence including the virtual inputs 713 such that the application is executed as if the user pressed an up button three times and the OK button to move the cursor from "ㅏ" to "ㄹ" and select "ㄹ." The electronic apparatus 300 may display an image 727 displaying "사ㄹ" in the input window by executing the application in response to the virtual inputs 713.

The electronic apparatus 300 displaying the image 727 of FIG. 7B may execute the application in response to virtual inputs 714 of FIG. 7A included in the virtual input sequence. The electronic apparatus 300 may generate the sequence including the virtual inputs 714 such that the application is executed as if the user pressed the down button three times and the OK button to move the cursor from "ㄹ" to "ㅏ"

and select "ㅏ." The electronic apparatus 300 may display an image displaying "사라" in the input window by executing the application in response to the virtual inputs 714.

The electronic apparatus 300 displaying the image displaying "사라" in the input window may execute the application in response to virtual inputs 715 of FIG. 7A included in the virtual input sequence. The electronic apparatus 300 may generate the sequence including the virtual inputs 715 such that the application is executed as if the user pressed the up button two times, the right button, and the OK button to move the cursor from "ㅏ" to "ㅇ" and select "ㅇ." The electronic apparatus 300 may display an image 729 displaying "사랑" in the input window by executing the application in response to the virtual inputs 715.

The electronic apparatus 300 displaying the image 729 of FIG. 7B may reproduce content found in response to virtual inputs 716 of FIG. 7A included in the virtual input sequence. The application may search for content having a title input to the input window, based on the input title, and display a thumbnail image of found content. The electronic apparatus 300 may display a screen 731 including the image 729 by executing the application in response to the virtual inputs 711 through 715. The electronic apparatus 300 displaying the screen 731 may execute the application in response to the virtual inputs 716 included in the virtual input sequence. The electronic apparatus 300 may generate the virtual input sequence including the virtual inputs 716 such that the application is executed as if the user pressed the right button four times and the OK button to move the cursor from "ㅇ" to a thumbnail image of content and select content where the cursor is positioned. The electronic apparatus 300 may select and reproduce found content by executing the application in response to the virtual inputs 716.

The electronic apparatus 300 according to an embodiment of the disclosure may obtain information about a plurality of pages displayable when the application is executed, so as to generate the virtual input sequence. The information about the plurality of pages may be pre-stored in the electronic apparatus 300 or received from an external apparatus, such as a server. The plurality of pages about the application may form a graph structure in which pages movable therebetween are connected to each other. The information about the plurality of pages may include information about a feature point of each page. For example, the information about the plurality of pages may include information about at least one of a size, color, text, sign, or metadata of a UI included in a screen when the screen corresponding to each page is displayed. Also, the information about the plurality of pages may include information about a user input to be input for movement between the pages.

The electronic apparatus 300 may determine an optimum path among various paths for moving from a current page to a target page, and derive a tree structure based on the determined optimum path.

Figure 8:
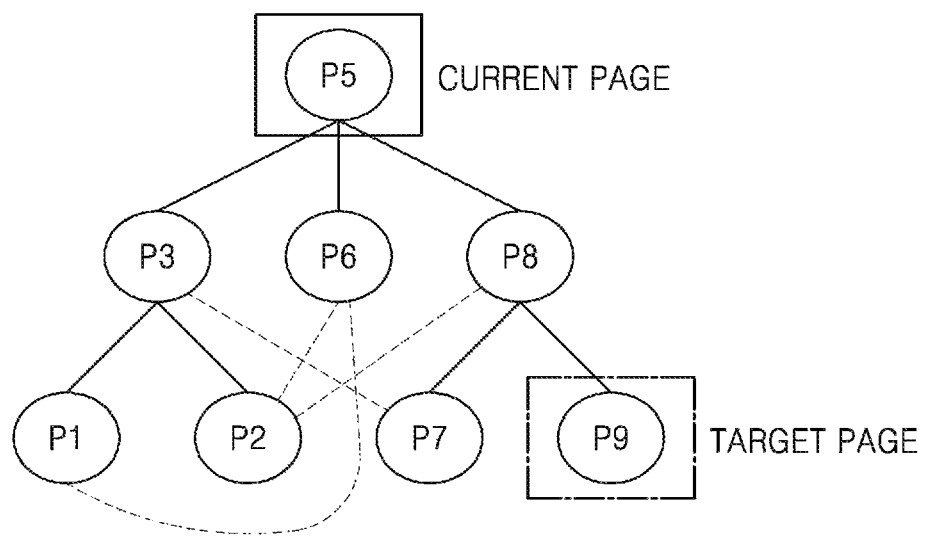
FIGS. 8 and 9 are diagrams for describing a tree structure of a plurality of pages of an application stored according to various embodiments of the disclosure.
Figure 9:
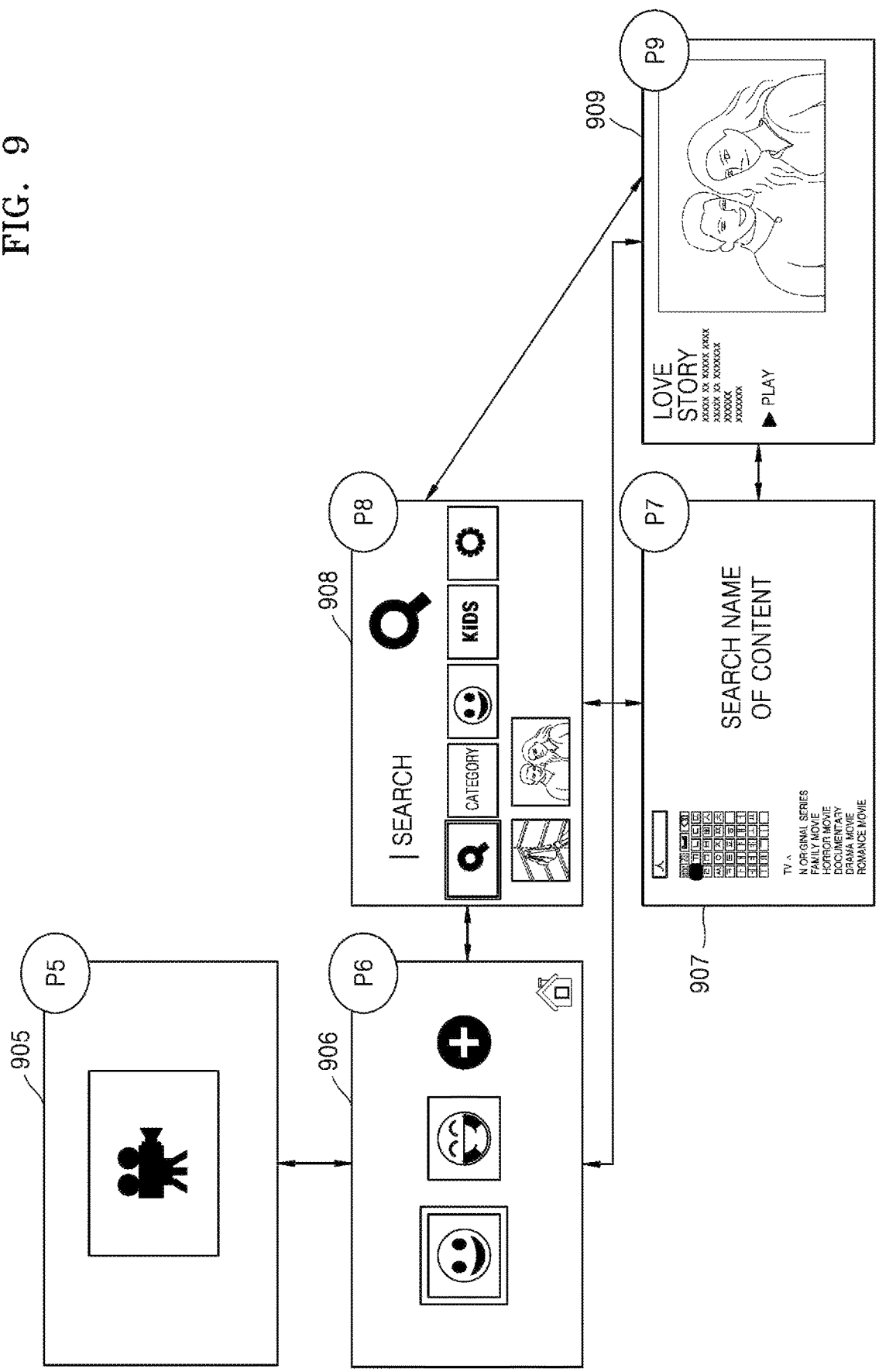

FIGS. 8 and 9 are diagrams for describing a tree structure of a plurality of pages of an application stored according to an embodiment.

As shown in FIG. 8, the plurality of pages may have layers in the tree structure. An upper page in the three structure is movable to a plurality of lower pages, and movement between the lower pages is performed only through the upper page. According to an embodiment, a layer of pages may be relative. For example, a particular page may be an upper page with respect to another page, and the particular page may be a lower page with respect to still another page. The application may move between the pages, based on a pre-determined user input. Moving of the application from a first page to a second page may denote that when the application is executed by the electronic apparatus 300, a screen corresponding to the first page is displayed and then a screen corresponding to the second page is displayed.

For example, the electronic apparatus 300 where the application corresponding to the plurality of pages of FIG. 8 is installed may display a screen corresponding to a fifth page P5, and then display a screen corresponding to one of a third page P3, a sixth page P6, and an eighth page P8 in response to a particular user input. After the application moves from the fifth page P5 to the third page P3, the electronic apparatus 300 may display a screen corresponding to one of a first page P2 and a second page p2, instead of the third page P3, in response to a particular user input.

Lines connecting the pages of FIG. 8 may indicate a user input causing the application to move between the pages. Different lines may indicate different inputs. Solid lines in FIG. 8 may indicate optimum paths connecting the pages whereas broken lines may indicate paths excluded from the derived tree structure because the movement between the pages is possible but is not optimum path. Accordingly, the electronic apparatus 300 displaying the screen corresponding to the third page P3 may display a screen corresponding to a seventh page P2 instead of the third page P3, in response to a user input different from the particular user input for switching to the screen corresponding to the first page P2 or the second page P2.

The electronic apparatus 300 according to an embodiment of the disclosure may generate a virtual input sequence for moving from a page corresponding to a first screen currently displayed to a target page determined based on a voice command of the user. An example in which the electronic apparatus 300 is displaying the screen corresponding to the fifth page P5 of FIG. 8 and determined a ninth page P9 as a target page based on a voice command of the user will be described.

The electronic apparatus 300 may determine a path for moving from the fifth page P5 to the ninth page P9, based on the tree structure of the plurality of pages of the application. For example, the determined path for moving from the fifth page P5 to the ninth page P9 may be a shortest path moving through the least number of pages, a path moving through a page preferred by the user, or a path pre-learned to be a path frequently used by the user.

Referring to FIG. 8, the electronic apparatus 300 may select a path moving from the fifth path P5 to the ninth path P9 through the eighth page P8 among paths for moving from the fifth page P5 to the ninth page P9. The electronic apparatus 300 may generate a virtual input sequence including a plurality of virtual inputs to display a screen corresponding to a page moved according to the selected path.

FIG. 9 illustrates an example of a tree structure of a plurality of pages of the video watching application shown in FIGS. 6A through 7B above.

An example in which the electronic apparatus 300 is displaying a screen 905 corresponding to the fifth page P5 of FIG. 9 and a voice command of "play Love Story from video watching application" from a user is received will be described. The electronic apparatus 300 may determine that a currently displayed screen corresponds to the fifth page P5 among the plurality of pages by analyzing the currently displayed screen.

The electronic apparatus 300 may determine that the voice command of the user is a voice command instructing content reproduction by performing voice recognition on the voice command of the user. The electronic apparatus 300 may determine the ninth page P9 related to the content reproduction as a target page among the plurality of pages.

The electronic apparatus 300 may determine a path for moving from the fifth page P5 corresponding to the currently displayed screen to the ninth page P9, and generate a virtual input sequence for moving along the determined path. For example, the electronic apparatus 300 may determine to move to the ninth page P9 through the sixth page P6, the eighth page P8, and the seventh page P7. However, according to an embodiment, the path determined by the electronic apparatus 300 may vary according to pre-learned information, according to users, or according to voice commands.

The electronic apparatus 300 may generate the virtual input sequence for moving along the determined path. The virtual input sequence generated by the electronic apparatus 300 may include a virtual input for displaying a screen 906 for selecting a profile of the user, instead of the start screen 905, a virtual input for displaying a main menu screen 908 instead of the screen 906, a virtual screen for displaying a content search screen 907 instead of the screen 908, a virtual input for searching for content on the screen 907, and a virtual input for displaying a content reproduction start screen 909 instead of the screen 907.

As shown in FIG. 9, the electronic apparatus 300 executing the application in response to the generated virtual input sequence may operate as follows. In order to display the screen 909 corresponding to the ninth page P9 related to content reproduction, the electronic apparatus 300 may display the screen 906 corresponding to the sixth page P6 for selecting the profile of the user, instead of the start screen 905 corresponding to the fifth page P5. The electronic apparatus 300 may display the main menu screen 908 corresponding to the eighth page P8 instead of the user profile selection screen 906 of the user. The electronic apparatus 300 may display the search screen 907 corresponding to the seventh page P7 for searching for content, instead of the main menu screen 908. The electronic apparatus 300 may display the reproduction start screen 909 for reproducing found content, instead of the search screen 907.

The tree structure shown in FIGS. 8 and 9 may be learned by analyzing a user input pattern received from the user. Hereinafter, a method of learning a user input pattern will be described in detail.

The electronic apparatus 300 according to an embodiment of the disclosure or a server communicating with the electronic apparatus 300 may learn at least one user input that is input with respect to at least one user using an application.

Figure 10:
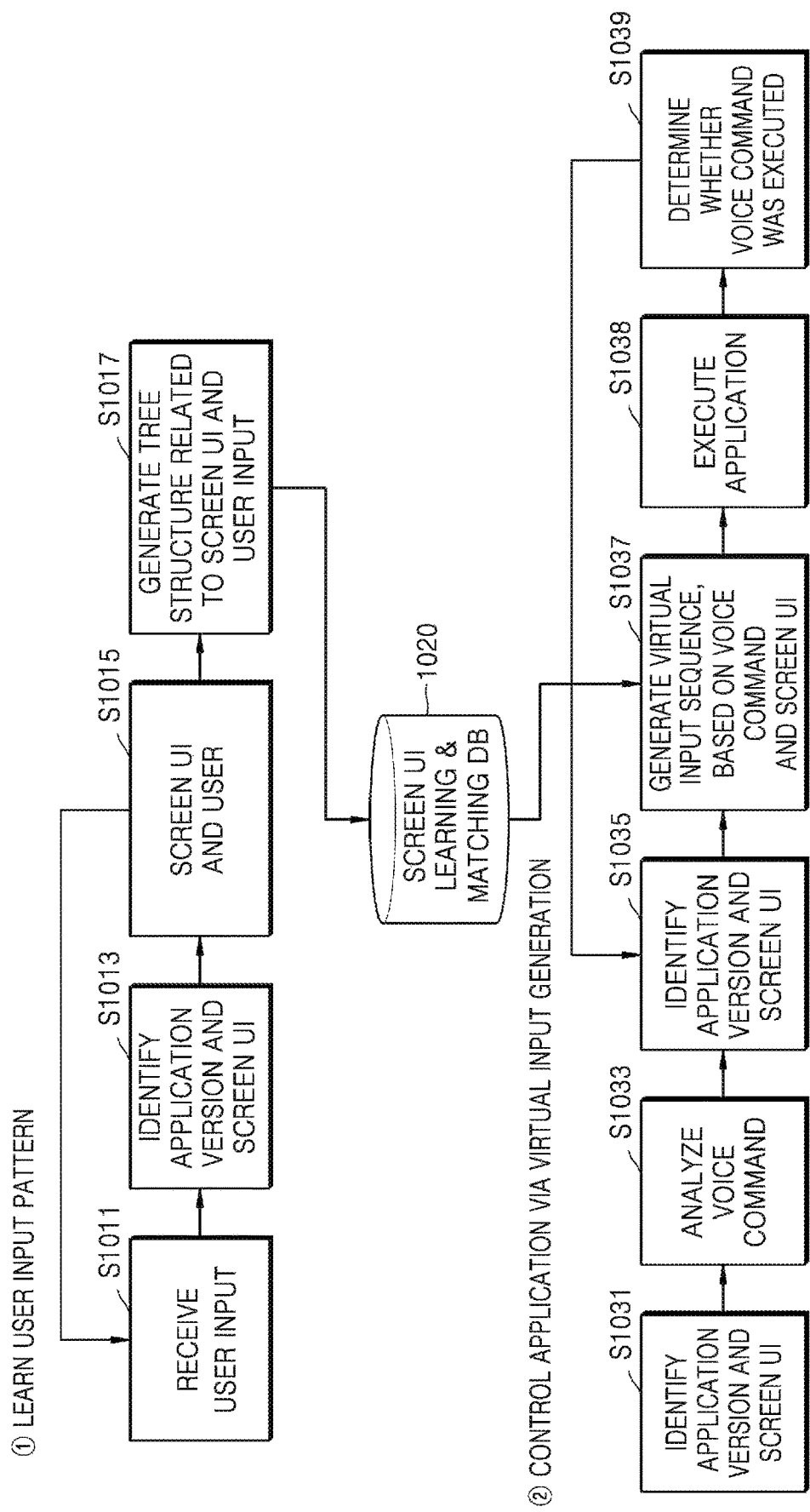
FIG. 10 is a diagram for describing a method, performed by an electronic apparatus, of learning a user input pattern and executing an application based on learned information, according to various embodiments of the disclosure.

FIG. 10 is a diagram for describing a method of, performed by an electronic apparatus, learning a user input pattern and executing an application based on learned information, according to an embodiment.

As shown in FIG. 10, the electronic apparatus 300 may learn a user input pattern of a user using an application. The electronic apparatus 300 may execute and control the application by generating a virtual input corresponding to a voice command of the user, based on learned data.

In operation S1011, the electronic apparatus 300 may receive a user input from the user while the application is executed. According to an embodiment, the user input received by the electronic apparatus 300 may be input through a user input device included in the electronic apparatus 300. Alternatively, the electronic apparatus 300 may receive a user input received through a separate electronic apparatus or separate user input device, without having to directly receive the user input. For example, the electronic apparatus 300 may display a screen different from a currently displayed screen by executing the application in response to the user input received in operation S1011.

In operation S1013, the electronic apparatus 300 may identify a version of the application being executed and a UI of the screen being displayed. According to an embodiment, the electronic apparatus 300 may analyze at least one of a size, color, text, sign, or metadata of the UI of the screen being displayed. For example, the electronic apparatus 300 may collect text on the screen whenever the screen is switched in response to the user input.

In operation S1015, the electronic apparatus 300 may determine an intention of the user input received in operation S1011, based on the screen being switched in response to the user input. For example, when the application switched a screen for searching for content to a screen for reproducing content, in response to the user input received in operation S1011, the electronic apparatus 300 may determine that the received user input is a user input for reproducing found content. The electronic apparatus 300 may return to operation S1011 to repeat processes of receiving a user input, analyzing a UI of a screen, and determining an intention of the user input.

The electronic apparatus 300 may analyze the intention of the user input based on at least one of text displayed on the screen or metadata not displayed on the screen. The metadata may include a function name or the like included in a programming language (for example, Hypertext Markup Language (HTML) constituting the screen. For example, the electronic apparatus 300 may execute the application in response to particular user inputs to display a first screen including text of "drive," a second screen including text of "search," and a third screen including text of "reproduce." In this case, the electronic apparatus 300 may determine that the particular user inputs are user inputs for driving the application, searching for content, and reproducing fond content.

For example, the electronic apparatus 300 may execute the application in response to particular user inputs to display a first screen including meta information related to "drive," a second screen including metal information related to "search," and a third screen including meta information related to "reproduce." In this case, the electronic apparatus 300 may determine that the particular user inputs are user inputs for driving the application, searching for content, and reproducing found content.

In operation S1017, the electronic apparatus 300 may generate a tree structure related to UIs included in screens displayed when the application is executed and user inputs received from the user. The generated tree structure may be stored in a database (DB) 1020.

The DB 1020 may be included in the electronic apparatus 300 or stored in a server communicating with the electronic apparatus 300. The DB 1020 according to an embodiment of the disclosure may learn screens that were displayed when the application is executed to match the screens with a user input for movement between the screens, and store matching information. The DB 1020 may store information about a plurality of pages of the application, which are learned when the electronic apparatus 300 repeats operations S1011, S1013, and S1015.

The information about the plurality of pages may include information related to a characteristic of each of the plurality of pages. The information related to the characteristic of the page may include, when a screen corresponding to the page is displayed, a characteristic of at least one UI displayed on the screen or a layout of the screen. The characteristic of the UI may include at least one of a size, color of the UI, text, sign included in the UI, or metadata related to the UI. Also, the information related to the characteristic of the page may include information about to which pages the page is connected and information about user inputs to be input for movement between the pages.

In cases where the electronic apparatus 300 displays various screens by executing the application, the electronic apparatus 300 according to an embodiment of the disclosure may analyze the user input pattern of the user. The electronic apparatus 300 may determine the intention of each user input, based on the screens switched in response to the user inputs. The electronic apparatus 300 may determine the intention of the user input by analyzing text displayed on the screen displayed by the electronic apparatus 300 when the user input is received or on the screen displayed by the electronic apparatus 300 after the user input is received.

The electronic apparatus 300 may analyze a pattern between user inputs received through the user input device, UIs displayed on a screen, and operations finally performed by an application. The electronic apparatus 300 may generate a template corresponding to a voice command to be received later, by learning the user input pattern.

Meanwhile, the electronic apparatus 300 may generate a virtual input sequence corresponding to the voice command of the user and control the application, based on the learned user input pattern.

In operation S1031, the electronic apparatus 300 may receive the voice command. In operation S1033, the electronic apparatus 300 may analyze the received voice command. In operation S1035, the electronic apparatus 300 may identify the version of the application being executed and the UI of the screen being displayed. The electronic apparatus 300 may obtain the information about the plurality of pages corresponding to the identified version of the application.

In operation S1037, the electronic apparatus 300 may generate the virtual input sequence, based on the received voice command and the UI of the screen being displayed. According to an embodiment, the electronic apparatus 300 may generate the virtual input sequence for performing an operation corresponding to the received voice command through the application. For example, the electronic apparatus 300 may switch a user input pattern related to the intention of the voice command among pre-learned user input patterns to the virtual input sequence.

The electronic apparatus 300 may determine a target page based on the received voice command, and determine a current page corresponding to the screen being displayed. The electronic apparatus 300 may determine a path for moving from the current page to the target page, based on the information about the plurality of pages of the application stored in the DB 1020. The electronic apparatus 300 may generate the virtual input sequence including a plurality of virtual inputs so as to display a screen corresponding to pages moved according to the determined path.

In operation S1038, the electronic apparatus 300 may execute the application in response to the generated virtual input sequence.

In operation S1039, the electronic apparatus 300 may determine whether the application was properly executed according to the voice command of the user whenever the screen is changed when the application is executed in response to at least one virtual input included in the virtual input sequence. According to an embodiment, the electronic apparatus 300 may determine whether the application was properly executed according to the voice command of the user, by determining whether the screen being changed to is the screen corresponding to the page included in the path determined in operation S1037. When it is determined that the application is not properly executed according to the voice command of the user, the electronic apparatus 300 may return to operation S1035 to identify the version of the application being executed by the electronic apparatus 300 again and obtain information about a plurality of pages corresponding to the identified version of the application again.

Operations S1031 and S1033 of FIG. 10 may correspond to operation S410 of FIG. 4, and operations S1035 and S1037 of FIG. 10 may correspond to operations S420 and S430 of FIG. 4. Operation S1038 and S1039 of FIG. 10 may correspond to operation S440 of FIG. 4. For each operation of FIG. 4 and each operation of FIG. 10, which correspond to each other, details about each operation may be applied to its correspondent. Thus, redundant descriptions of corresponding operations will be omitted.

Meanwhile, in the above description, an example in which a single electronic apparatus learns a user input pattern and controls an application based on a virtual input is described for convenience of description, but embodiments of the disclosure are not limited thereto.

For example, a particular electronic apparatus may learn a user input pattern and another electronic apparatus may generate a virtual input and control an application, based on the learned user input pattern.

As another example, a server connected to an electronic apparatus may learn a user input pattern. Upon receiving learned information from the server, the electronic apparatus may generate a virtual input and control an application, based on the received information.

As another example, a server connected to a plurality of electronic apparatuses may learn user input patterns of a plurality of users. Information about a plurality of pages of an application may be obtained when the server learns user input patterns of the plurality of users using the application. The server may generate the information about the plurality of pages having a tree structure, by collecting screen change events input from the plurality of users using the plurality of electronic apparatuses. Here, data collected from the electronic apparatus for learning of the user input patterns may include all of screen change events input by the users with an intention.

As another example, information about a plurality of pages used to determine a path for movement between pages of an application may be generated by a third party provider providing the application.

An electronic apparatus according to an embodiment of the disclosure may include an electronic apparatus or server capable of solely recognizing voice, generating a virtual input sequence, and executing an application as described above with reference to FIGS. 4 and 5, but is not limited thereto. A voice recognition system according to an embodiment of the disclosure may include an electronic apparatus and a server.

Figure 11:
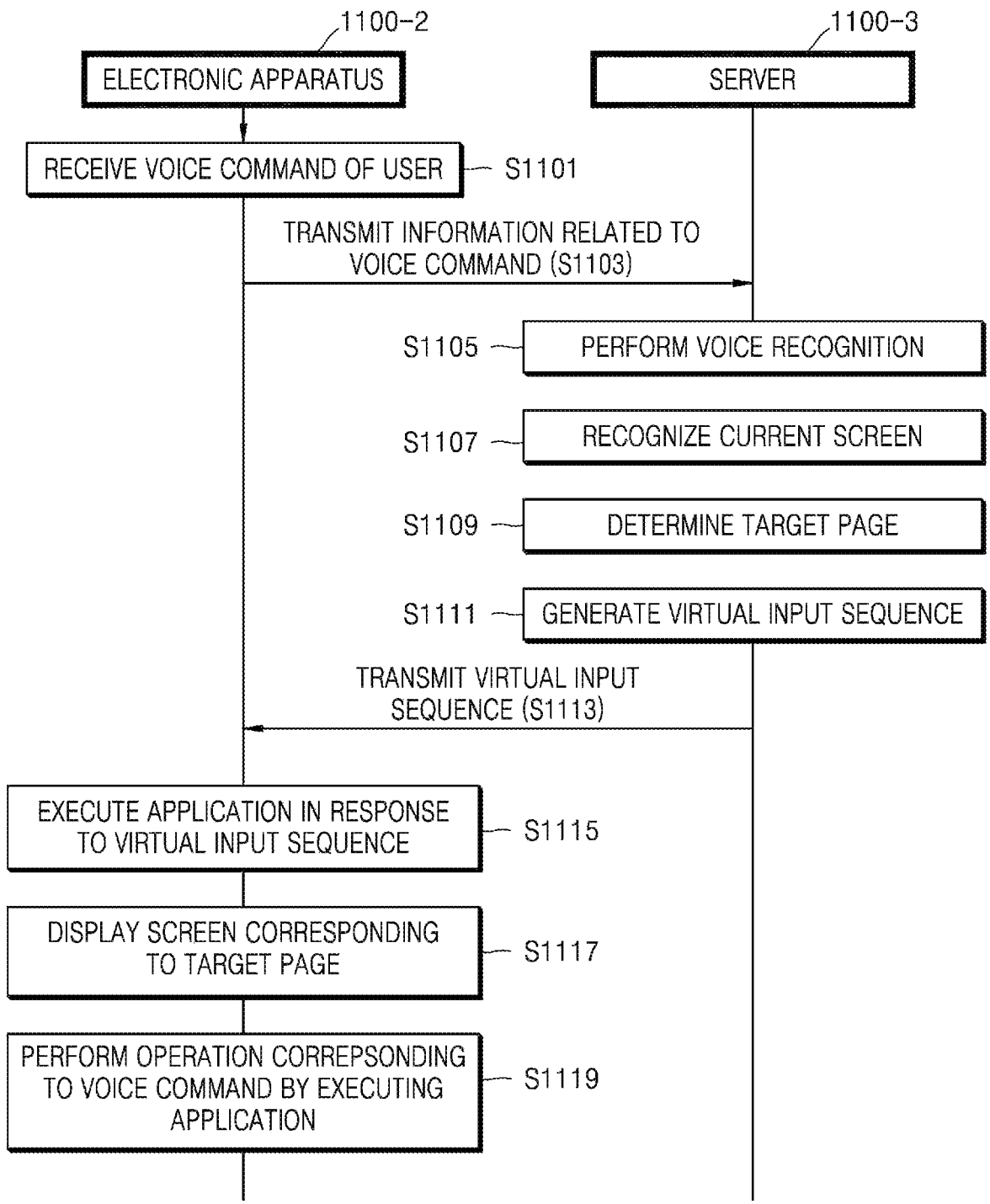
FIG. 11 is a flowchart of an operating method of a voice recognition system, according to various embodiments of the disclosure.

FIG. 11 is a flowchart of an operating method of a voice recognition system, according to an embodiment.

An electronic apparatus 1100-2 and a server 1100-3 may respectively correspond to the electronic apparatus 200-2 and the server 200-3 of FIG. 2B. As shown in FIG. 2B, the electronic apparatus 1100-2 and the server 1100-3 may be connected to each other wirelessly or via wires, and may transmit and receive data to and from each other.

In operation S1101, the electronic apparatus 1100-2 may receive a voice command of a user. In operation S1103, the electronic apparatus 1100-2 may transmit information related to the voice command to the server 1100-3. According to an embodiment, the information related to the voice command may include a voice signal including the voice command, may include a feature vector of the voice signal, and may be text generated by performing voice recognition on the voice command. The electronic apparatus 1100-2 may further transmit information about a first screen currently displayed to the server 1100-3.

In operation S1105, the server 1100-3 may perform voice recognition on the information related to the voice command received from the electronic apparatus 1100-2.

In operation S1107, the server 1100-3 may recognize the first screen currently displayed through the electronic apparatus 1100-2. According to an embodiment, the server 1100-3 may recognize the first screen by analyzing a characteristic of a UI displayed on the first screen. The server 1100-3 may determine a version of an application being executed by the electronic apparatus 1100-2, based on the first screen. The server 1100-3 may distinguish and pre-store information about a plurality of pages displayable when the application of the corresponding version is executed, according to versions of the application. The server 1100-3 may determine the version of the application executed through the electronic apparatus 1100-2 by comparing a result of analyzing the first screen and the pre-stored information about the plurality of pages.

The server 1100-3 may obtain the information about the plurality of pages of the application, based on the determined version. The server 1100-3 may determine which page among the plurality of pages of the application is the first screen currently displayed. The server 1100-3 may determine that a first page corresponds to the first screen among the plurality of pages.

In operation S1109, the server 1100-3 may determine a target page among the plurality of pages, based on a result of the voice recognition and information related to a characteristic of each of the plurality of pages.

In operation S1111, the server 1100-3 may generate a virtual input sequence. The server 1100-3 may generate the virtual input sequence including virtual inputs causing the electronic apparatus 1100-2 to perform an operation corresponding to the voice command through the application. The server 1100-3 may generate the virtual input sequence including the virtual inputs causing the electronic apparatus 1100-2 to display a second screen corresponding to the target page, instead of the first screen currently displayed.

The server 1100-3 may determine a path for moving from the first page corresponding to the first screen to the target page within the plurality of pages having a tree structure. The server 1100-3 may obtain information about at least one user input to be input to move from the first page to the target page according to the determined path. The server 1100-3 may generate the virtual input sequence including at least one virtual input corresponding to at least one user input, based on the obtained information about at least one user input.

In operation S1113, the server 1100-3 may transmit the generated virtual input sequence to the electronic apparatus 1100-2.

In operation S1115, the electronic apparatus 1100-2 may execute the application in response to the virtual input included in the virtual input sequence. In operation S1117, the electronic apparatus 1100-2 may display a screen corresponding to the target page. In operation S1119, the electronic apparatus 1100-2 may execute the application to perform the operation corresponding to the voice command. The electronic apparatus 1100-2 may execute the application to perform the operation corresponding to the voice command, in response to the virtual input included in the virtual input sequence.

In FIG. 11, an example in which the electronic apparatus 1100-2 is directly switched from the first screen to the second screen corresponding to the target page is illustrated. However, the server 1100-3 according to an embodiment of the disclosure may determine a path moving from the first page corresponding to the first screen to the target page through at least one second page, within the tree structure of the plurality of pages of the application. In this case, the electronic apparatus 1100-2 or the server 1100-3 may analyze a UI on the screen whenever the screen displayed by the electronic apparatus 1100-2 is changed in response to the virtual input included in the virtual input sequence. When the screen being changed to is a screen corresponding to the page included in the path determined in operation S1111, the electronic apparatus 1100-2 may execute the application in response to a next virtual input included in the virtual input sequence. On the other hand, when the screen being changed to is not the screen corresponding to the page included in the path determined in operation S1111, the electronic apparatus 1100-2 may request the server 1100-3 to regenerate and transmit the virtual input sequence corresponding to the voice command of the user.

The embodiments described above may be written as computer programs and may be implemented in general-use digital computers that execute the programs using a computer-readable medium. Also, a structure of data used in the above embodiments may be recorded on the computer-readable medium via various methods. Also, the above embodiments may be embodied in a form of a recording medium having recorded thereon a computer-executable instruction, such as a program module executed by a computer. For example, methods implemented with a software module or algorithm may be stored in a computer-readable recording medium, as codes or program commands read and executed by a computer.

The computer-readable medium may be an arbitrary available medium accessible by a computer, and examples thereof include all volatile and non-volatile media and separable and non-separable media. Examples of the computer-readable medium include magnetic storage media (e.g., ROM, floppy disks, hard disks, etc.), optical recording media (e.g., CD-ROMs, or DVDs), etc., but are not limited thereto. Further, examples of the computer-readable medium may include a computer storage medium and a communication medium. Further, a plurality of computer-readable recording medium may be distributed over network coupled computer systems, and data, for example, program instructions and codes, stored in the distributed recording medium may be executed by at least one computer.

The particular implementations shown and described herein are illustrative examples of the disclosure and are not intended to otherwise limit the scope of the disclosure in any way. For the sake of brevity, general electronics, control systems, software development and other functional aspects of the systems (and components of the individual operating components of the systems) may not be described in detail.

In the following description, terms such as "unit" and "module" indicate a unit for processing at least one function or operation, wherein the unit and the block may be embodied as hardware or software or embodied by combining hardware and software.

The "unit" and "module" may be embodied by a program stored in an addressable storage medium and executed by a processor.

For example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method, performed by an electronic apparatus, of executing an application based on a voice command of a user, the method comprising:
    performing voice recognition on the voice command for executing the application;
    determining a page for performing an operation corresponding to the voice command as a target page among a plurality of pages displayable when the application is executed, based on a result of the voice recognition;
    generating a virtual input sequence for displaying a second screen corresponding to the target page, instead of a first screen currently displayed; and
    executing the application in response to the virtual input sequence.

2. The method of claim 1, wherein the virtual input sequence comprises virtual inputs generated by the electronic apparatus such that the application is executed as if the electronic apparatus received user inputs with respect to the application from the user.

3. The method of claim 1, further comprising:
    determining a version of the application installed in the electronic apparatus, based on at least one of a size, a color of a user interface displayed on the first screen, text, a sign included in the user interface, or metadata related to the user interface; and
    obtaining information about the plurality of pages, based on the determined version.

4. The method of claim 1, further comprising recognizing a first page corresponding to the first screen among the plurality of pages, based on at least one of a size, a color of a user interface displayed on the first screen, text, a sign included in the user interface, or metadata related to the user interface.

5. The method of claim 1, wherein the generating of the virtual input sequence comprises generating the virtual input sequence for moving from a first page corresponding to the first screen to the target page, within a tree structure of the plurality of pages with respect to the application.

6. The method of claim 1, wherein the executing of the application comprises:
    displaying the second screen corresponding to the target page;
    generating a virtual input causing the application to perform the operation corresponding to the voice command; and
    executing the application in response to the virtual input.

7. The method of claim 1, further comprising, while the application is being executed before the voice command is received, storing information about a user input received from the user to move from a first page corresponding to the first screen to the target page,
wherein the generating of the virtual input sequence comprises generating a virtual input corresponding to the user input.

8. A non-transitory computer-readable recording medium having recorded thereon instructions that, when executed by at least one processor, cause the at least one processor to perform the method of claim 1.

9. An electronic apparatus comprising:
    a receiver configured to receive a voice command of a user;
    at least one processor configured to:
        perform voice recognition on the voice command,
        determine a page for performing an operation corresponding to the voice command as a target page among a plurality of pages displayable when an application is executed, based on a result of the voice recognition,
        generate a virtual input sequence for displaying a second screen corresponding to the target page, instead of a first screen currently displayed, and
        execute the application in response to the virtual input sequence; and
    a display displaying the first screen.

10. The electronic apparatus of claim 9, wherein the virtual input sequence comprises virtual inputs generated by the electronic apparatus such that the application is executed as if the electronic apparatus received user inputs with respect to the application from the user.

11. The electronic apparatus of claim 9, wherein the at least one processor is further configured to determine a version of the application installed in the electronic apparatus, based on at least one of a size, a color of a user interface displayed on the first screen, text, a sign included in the user interface, or metadata related to the user interface, and obtain information about the plurality of pages, based on the determined version.

12. The electronic apparatus of claim 9, wherein the at least one processor is further configured to recognize a first page corresponding to the first screen among the plurality of pages, based on at least one of a size, a color of a user interface displayed on the first screen, text, a sign included in the user interface, or metadata related to the user interface.

13. The electronic apparatus of claim 9, wherein the at least one processor is further configured to generate the virtual input sequence for moving from a first page corresponding to the first screen to the target page, within a tree structure of the plurality of pages with respect to the application.

14. The electronic apparatus of claim 9, wherein the at least one processor is further configured to:
    control the display to display the second screen corresponding to the target page by executing the application in response to the virtual input sequence; and
    generate a virtual input causing the application to perform the operation corresponding to the voice command, and execute the application in response to the virtual input.

15. A server communicating with an electronic apparatus, the server comprising:
    a receiver configured to receive a voice command of a user input through the electronic apparatus;
    at least one processor configured to:
        perform voice recognition on the voice command,
        determine a page for performing an operation corresponding to the voice command as a target page among a plurality of pages displayable when an application is executed in the electronic apparatus, and generate a virtual input sequence for controlling the electronic apparatus to display a second screen corresponding to the target page, instead of a first screen currently displayed by the electronic apparatus; and a transmitter configured to transmit the virtual input sequence to the electronic apparatus, wherein the electronic apparatus executes the application in response to the virtual input sequence.

\* \* \* \* \*